United States Patent
Osada

(10) Patent No.: US 12,345,550 B2
(45) Date of Patent: Jul. 1, 2025

(54) ABSOLUTE ENCODER

(71) Applicant: MINEBEA MITSUMI Inc., Nagano (JP)

(72) Inventor: Yasuo Osada, Kawaguchi (JP)

(73) Assignee: MINEBEA MITSUMI Inc., Nagano (JP)

( * ) Notice: Subject to any disclaimer, the term of this patent is extended or adjusted under 35 U.S.C. 154(b) by 95 days.

(21) Appl. No.: 17/757,479

(22) PCT Filed: Dec. 7, 2020

(86) PCT No.: PCT/JP2020/045407
§ 371 (c)(1),
(2) Date: Jun. 16, 2022

(87) PCT Pub. No.: WO2021/124946
PCT Pub. Date: Jun. 24, 2021

(65) Prior Publication Data
US 2023/0020212 A1    Jan. 19, 2023

(30) Foreign Application Priority Data
Dec. 17, 2019   (JP) ................. 2019-227676

(51) Int. Cl.
*G01D 5/14* (2006.01)
*G01B 7/30* (2006.01)

(52) U.S. Cl.
CPC ................. *G01D 5/14* (2013.01); *G01B 7/30* (2013.01)

(58) Field of Classification Search
CPC .................. G01D 5/14; G01B 7/30
See application file for complete search history.

(56) References Cited

U.S. PATENT DOCUMENTS 7,591,174 B2 * 9/2009 Matsuda ............. B62D 15/022
                                                    73/117.02
10,059,366 B2   8/2018 Segawa
(Continued)

FOREIGN PATENT DOCUMENTS

CN    103990861 A    8/2014
CN    106660577 A    5/2017
(Continued)

OTHER PUBLICATIONS

International Search Report for corresponding International Application No. PCT/JP2020/045407 mailed Feb. 22, 2021.
(Continued)

*Primary Examiner* — Reena Aurora
(74) *Attorney, Agent, or Firm* — Chrisman Gallo Tochtrop LLC

(57) ABSTRACT

To reduce the influence of backlash in a reduction mechanism on detection accuracy. An absolute encoder includes a first worm gear portion rotating according to rotation of a main shaft and a first worm wheel portion meshing with the first worm gear portion. The absolute encoder is provided coaxially with the first worm wheel portion and includes a second worm gear portion rotating according to rotation of the first worm wheel portion and a second worm wheel portion meshing with the second worm gear portion. The absolute encoder also includes a biasing mechanism biasing the second worm gear portion in the direction of the second worm wheel portion.

16 Claims, 20 Drawing Sheets

(56) References Cited

U.S. PATENT DOCUMENTS

| | | | |
|---|---|---|---|
| 2009/0031569 A1 | 2/2009 | Schirp et al. | |
| 2017/0210412 A1 | 7/2017 | Segawa | |
| 2020/0132507 A1 | 4/2020 | Osada | |
| 2020/0280245 A1 | 9/2020 | Osada et al. | |
| 2022/0163318 A1* | 5/2022 | Osada | G01D 5/16 |

FOREIGN PATENT DOCUMENTS

| | | |
|---|---|---|
| DE | 102 58 846 A1 | 7/2004 |
| EP | 3 192 719 A1 | 7/2017 |
| EP | 3 211 380 A1 | 8/2017 |
| EP | 3 192 719 B1 | 9/2018 |
| EP | 3 211 380 B1 | 7/2020 |
| JP | 2006-008008 A | 1/2006 |
| JP | 2012-251601 A | 12/2012 |
| JP | 2015-174187 A | 10/2015 |
| JP | 2017-142157 A | 8/2017 |
| JP | 2019-015536 A | 1/2019 |
| JP | 2019-056564 A | 4/2019 |
| JP | 2019-148609 A | 9/2019 |
| JP | 2019-202596 A | 11/2019 |
| WO | 02/101914 A1 | 12/2002 |

OTHER PUBLICATIONS

Written Opinion for corresponding International Application No. PCT/JP2020/045407 dated Feb. 22, 2021 and English translation.
First Office Action dated Dec. 22, 2023 in corresponding Chinese Application No. 202080088337.6 and English translation.
Yu Li, "The research on backlash control based on new type of conical involute gear", CNKI Doctoral Thesis Full Text Database, vol. 2018, Issue 12, Dec. 15, 2018.

* cited by examiner

ABSOLUTE ENCODER

TECHNICAL FIELD

The present invention relates to an absolute encoder.

BACKGROUND ART

Conventionally, a rotary encoder is known to be used to detect the position and angle of a moving element in various types of control machines. Such a rotary encoder includes an incremental-type encoder detecting a relative position or angle, and an absolute encoder detecting an absolute position or angle. As such an absolute encoder, there is known a magnetic encoder device configured to detect an amount of rotation of a main shaft to be measured by way of attaching a magnetized permanent magnet to a rotating shaft (main shaft) to be measured and detecting the angle of rotation of the permanent magnet by using a magnetic sensor. There is also known a method for identifying the amount of rotation of the main shaft over multiple rotations by acquiring the rotation angle of a rotating body rotating and decelerating according to the rotation of the main shaft.

In such an absolute encoder, a structure is proposed for detecting the amounts of rotation of a plurality of permanent magnets by using corresponding magnetic sensors to expand the range of the identifiable amount of rotation of the main shaft while maintaining the resolution of the identifiable amount of rotation of the main shaft. For example, in one proposed structure, the main shaft and a secondary shaft or a subsequent shaft are linked by a reduction mechanism, and the amount of rotation of the permanent magnet attached to each shaft is detected by a corresponding magnetic sensor, to thereby identify the amount of rotation of the main shaft (see, for example, Patent Document 1).

CITATION LIST

Patent Literature

Patent Document 1: JP 2019-15536 A

SUMMARY OF INVENTION

Technical Problem

In the absolute encoder detecting amounts of rotation of the plurality of permanent magnets using such a reduction mechanism, the rotation of the main shaft must be accurately transmitted to the secondary axis or subsequent axis by the reduction mechanism to accurately identify the amounts of rotation. In particular, if a reduction mechanism using gears is employed, the rotation of the main shaft may not be accurately transmitted to the secondary shaft or subsequent shaft due to backlash between the gears of the reduction mechanism. Therefore, in this type of absolute encoder, a structure capable of eliminating backlash in the reduction mechanism is required to improve the detection accuracy.

The present invention has been made in view of the above-described problem, and an object of the present invention is to provide an absolute encoder capable of reducing the influence of backlash in a reduction mechanism on detection accuracy.

Solution to Problem

In order to achieve the above-described object, an absolute encoder according to the present invention is an absolute encoder configured to identify an amount of rotation of a main shaft over multiple rotations, the absolute encoder includes a first drive gear configured to rotate according to rotation of the main shaft, a first driven gear configured to mesh with the first drive gear, a second drive gear provided coaxially with the first driven gear and configured to rotate according to rotation of the first driven gear, a second driven gear configured to mesh with the second drive gear, and a biasing mechanism configured to bias the second drive gear in a direction of the second driven gear.

Advantageous Effects of Invention

With the absolute encoder according to the present invention, the influence of backlash in a reduction mechanism on detection accuracy can be reduced.

DESCRIPTION OF EMBODIMENTS

Figure 1:
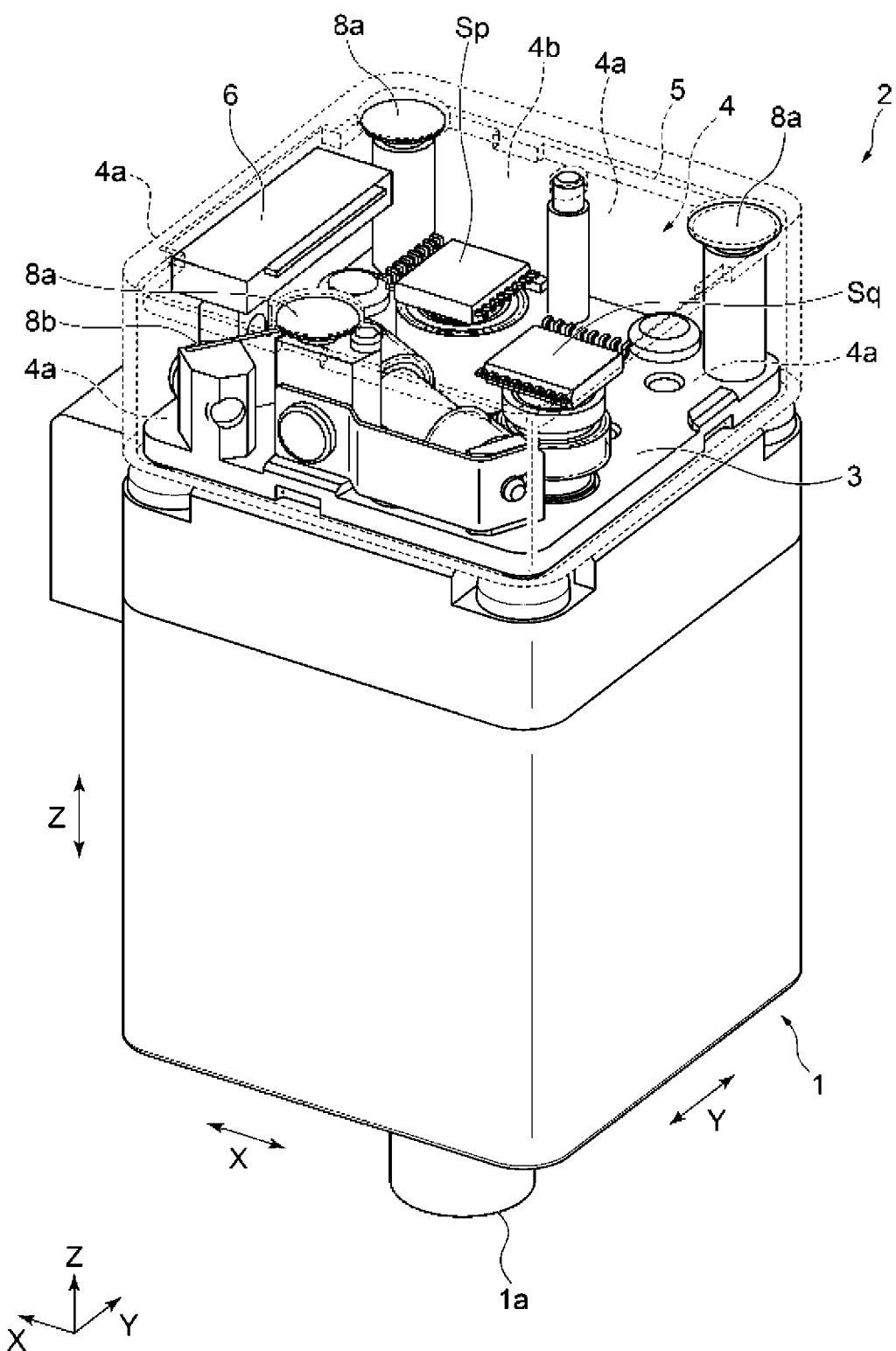
FIG. 1 is a perspective view schematically illustrating a configuration of an absolute encoder according to an embodiment of the present invention.

The present inventor found that, in an absolute encoder, an amount of rotation of the main shaft over multiple rotations (hereinafter, also referred to as "amount of rotation of the main shaft") can be identified by acquiring a rotation angle of a rotating body rotating and decelerating according to the rotation of the main shaft. That is, the amount of rotation of the main shaft can be identified by multiplying the rotation angle of the rotating body by a reduction ratio. Here, the range of the identifiable amount of rotation of the main shaft increases in proportion to the reduction ratio. For example, if the reduction ratio is 50, the amount of rotation of the main shaft over 50 rotations can be identified.

On the other hand, the required resolution of the rotating body decreases in proportion to the reduction ratio. For example, if the reduction ratio is 100, the resolution required for the rotating body per rotation of the main shaft is 360°/100=3.6°, and a detection accuracy of ±1.8° is required. On the other hand, when the reduction ratio is 50, the resolution required for the rotating body per rotation of the main shaft is 360°/50=7.2°, and a detection accuracy of ±3.6° is required.

Embodiments of the present invention will be described below with reference to the drawings. In each of the embodiments and modified examples described below, the same or equivalent components and members are denoted by the same reference symbols, and redundant descriptions are omitted as appropriate. The dimensions of the members in each drawing are enlarged or reduced as appropriate to facilitate understanding. Furthermore, some members that are not critical in describing embodiments are omitted from the drawings. Also, in the drawings, gears are illustrated without a gear shape. Terms including ordinal numbers such as "first" and "second" are used to describe various components, but these terms are used only for the purpose of distinguishing one component from other components and the components are not limited by these terms. Note that the present invention is not limited by the embodiments described below.

An absolute encoder 2 according to an embodiment of the present invention is an absolute encoder configured to identify an amount of rotation of a main shaft 1a over multiple rotations. The absolute encoder 2 includes a first worm gear portion 11 as a first drive gear rotating according to the rotation of the main shaft 1a, and a first worm wheel portion 21 as a first driven gear meshing with the first worm gear portion 11. The absolute encoder 2 further includes a second worm gear portion 22 provided coaxially with the first worm wheel portion 21 and serving as a second drive gear rotating according to the rotation of the first worm wheel portion 21, and a second worm wheel portion 31 as a second driven gear meshing with the second worm gear portion 22. The absolute encoder 2 further includes a biasing mechanism 40 biasing the second worm gear portion 22 in the direction of the second worm wheel portion 31. Hereinafter, the structure of the absolute encoder 2 will be described in detail.

Figure 2:
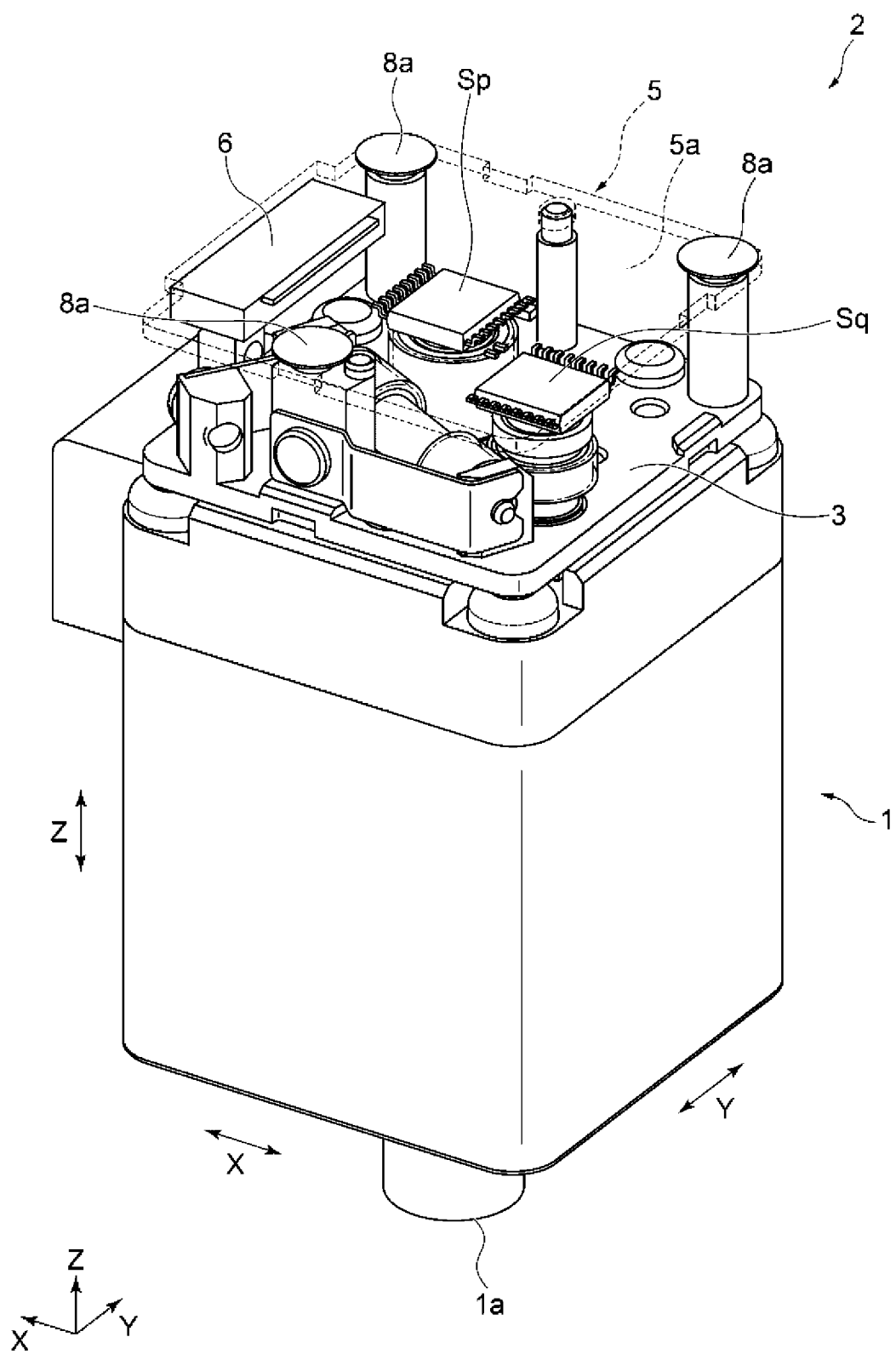
FIG. 2 is a perspective view schematically illustrating the configuration of the absolute encoder in FIG. 1 with a case removed.

FIG. 1 is a perspective view schematically illustrating the configuration of the absolute encoder 2 according to the embodiment of the present invention. FIG. 2 is a perspective view illustrating the configuration of the absolute encoder 2 in FIG. 1 with a case 4 removed. FIG. 1 is a see-through illustration looking through the case 4 and a substrate 5 of the absolute encoder 2, and FIG. 2 is a see-through illustration looking through the substrate 5 of the absolute encoder 2.

In the present embodiment, for convenience of explanation, the absolute encoder 2 will be described with reference to an XYZ Cartesian coordinate system. The X-axis direction corresponds to a horizontal left-right direction, the Y-axis direction corresponds to a horizontal front-rear direction, and the Z-axis direction corresponds to a vertical up-down direction. The Y-axis direction and the Z-axis direction are orthogonal to the X-axis direction. In the present description, the X-axis direction is also referred to as the left side or the right side, the Y-axis direction is also referred to as the front side or the rear side, and the Z-axis direction is also referred to as the upper side or the lower side. The absolute encoder 2 illustrated in FIGS. 1 and 2 is orientated such that the left side in the X-axis direction is the left side and the right side in the X-axis direction is the right side. Further, the absolute encoder 2 illustrated in FIGS. 1 and 2 is orientated such that the near side in the Y-axis direction is the front side and the back side in the Y-axis direction is the rear side. Additionally, the absolute encoder 2 illustrated in FIGS. 1 and 2 is orientated such that the upper side in the Z-axis direction is the upper side and the lower side in the Z-axis direction is the lower side. A state viewed from the upper side in the Z-axis direction is referred to as a plan view, a state viewed from the front side in the Y-axis direction is referred to as a front view, and a state viewed from the X-axis direction is referred to as a side view. The notation for such directions is not intended to limit the usage orientation of the absolute encoder 2, and the absolute encoder 2 may be used in any orientation.

As described above, the absolute encoder 2 is an absolute-type encoder identifying and outputting an amount of rotation of the main shaft 1a of a motor 1 over multiple rotations. In the embodiment of the present invention, the absolute encoder 2 is provided at an end portion at the upper side in the Z-axis direction of the motor 1. In the embodiment of the present invention, the absolute encoder 2 has a substantially rectangular shape in plan view, and has a rectangular shape being thin and long in the up-down direction being the extension direction of the main shaft 1a in front view and side view. That is, the absolute encoder 2 has a flat rectangular parallelepiped shape being longer in the horizontal direction than in the up-down direction.

The absolute encoder 2 includes a hollow and angular tubular case 4 accommodating the internal structure. The case 4 has a plurality of (e.g., four) outer wall portions 4a surrounding at least a portion of the main shaft 1a of the motor 1, a main shaft gear 10, and an intermediate gear 20. Furthermore, a lid portion 4b is formed integrally with the four outer wall portions 4a of the case 4 at upper end portions of the outer wall portions 4a.

The motor 1 may be a stepper motor or a brushless DC motor, for example. As an example, the motor 1 may be a motor employed as a drive source for driving an industrial robot via a reduction mechanism such as strain wave gearing. The main shaft 1a of the motor 1 projects from the case of the motor at both sides in the up-down direction. The absolute encoder 2 outputs the amount of rotation of the main shaft 1a of the motor 1 as a digital signal.

The motor 1 has a substantially rectangular shape in plan view, and also has a substantially rectangular shape in the up-down direction. That is, the motor 1 has a substantially cuboid shape. In plan view, the four outer wall portions constituting the outer shape of the motor 1 each have a length of 25 mm, for example. In other words, the external shape of the motor 1 is a 25 mm square in plan view. The absolute encoder 2 provided in the motor 1 is, for example, a 25 mm square to match the external shape of the motor 1.

In FIGS. 1 and 2, the substrate 5 is provided covering the inside of the absolute encoder 2 together with the case 4. The substrate 5 has a substantially rectangular shape in plan view, and is a plate-like printed wiring substrate being thin in the up-down direction. A connector 6 is connected to the substrate 5 and is used for coupling the absolute encoder 2 to an external device (not illustrated).

Figure 3:
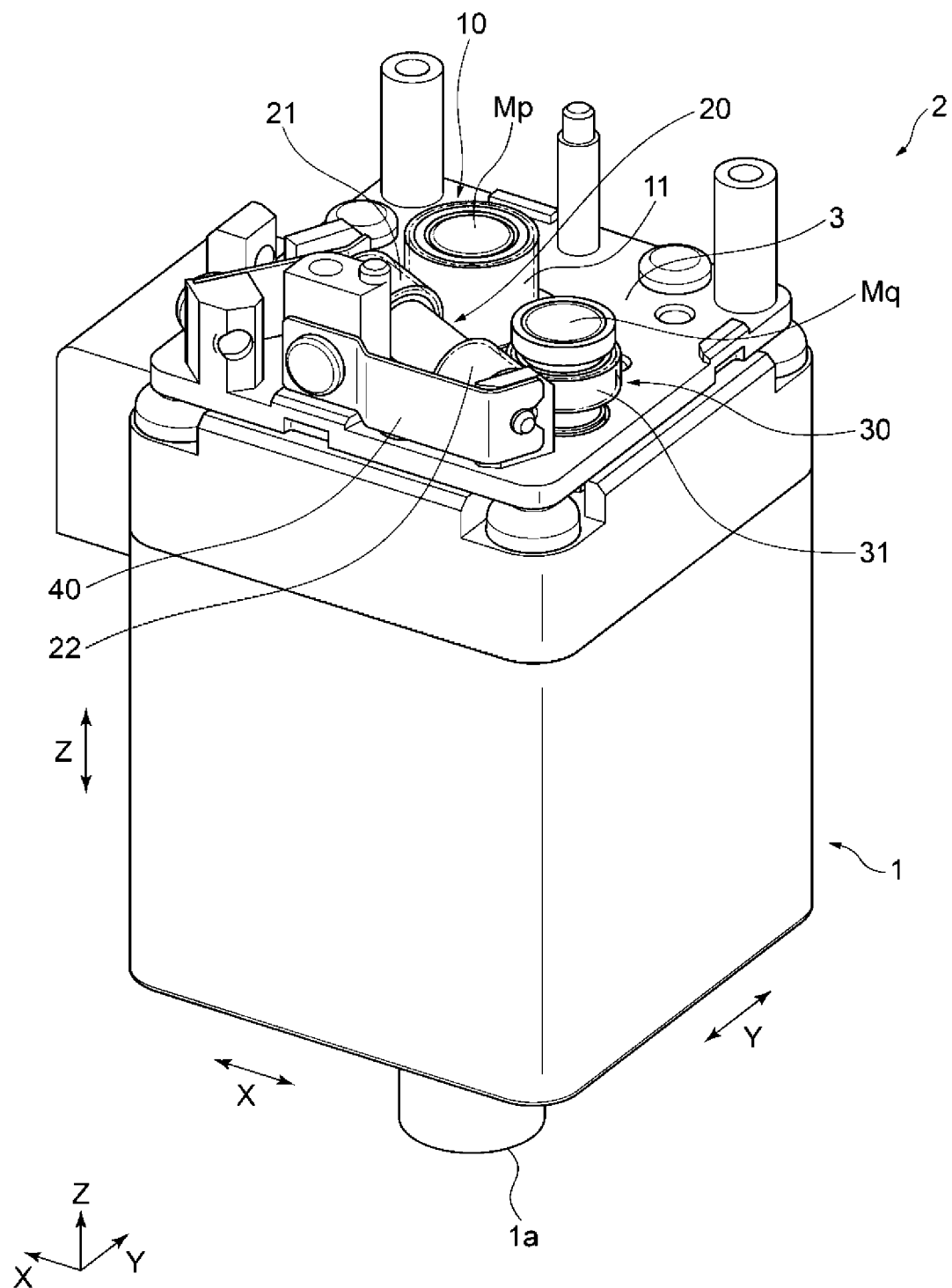
FIG. 3 is a perspective view schematically illustrating the configuration of the absolute encoder in FIG. 2 with a substrate and a connector removed.
Figure 4:
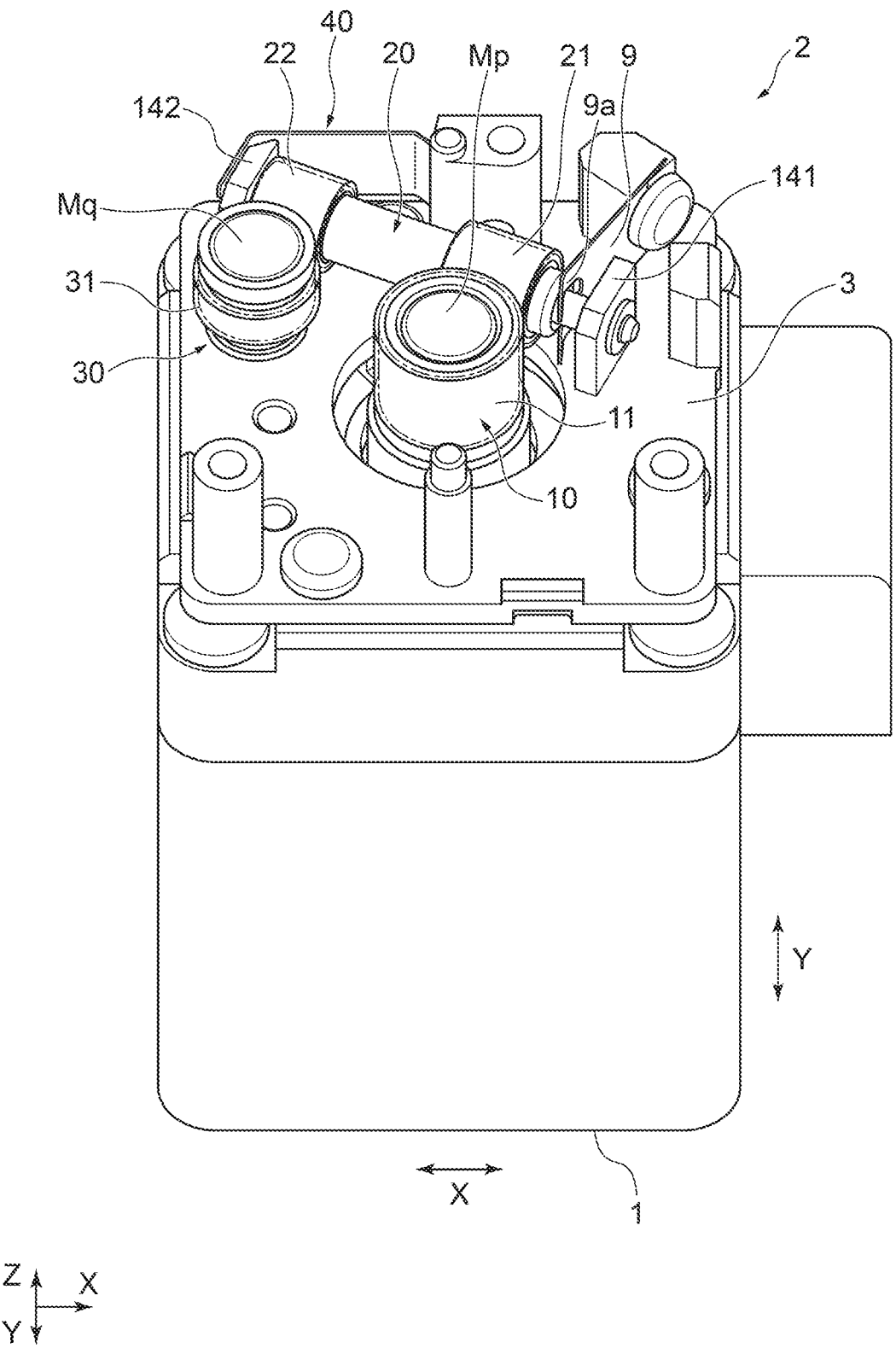
FIG. 4 is a perspective view schematically illustrating the configuration of the absolute encoder in FIG. 3 when viewed from another angle.
Figure 5:
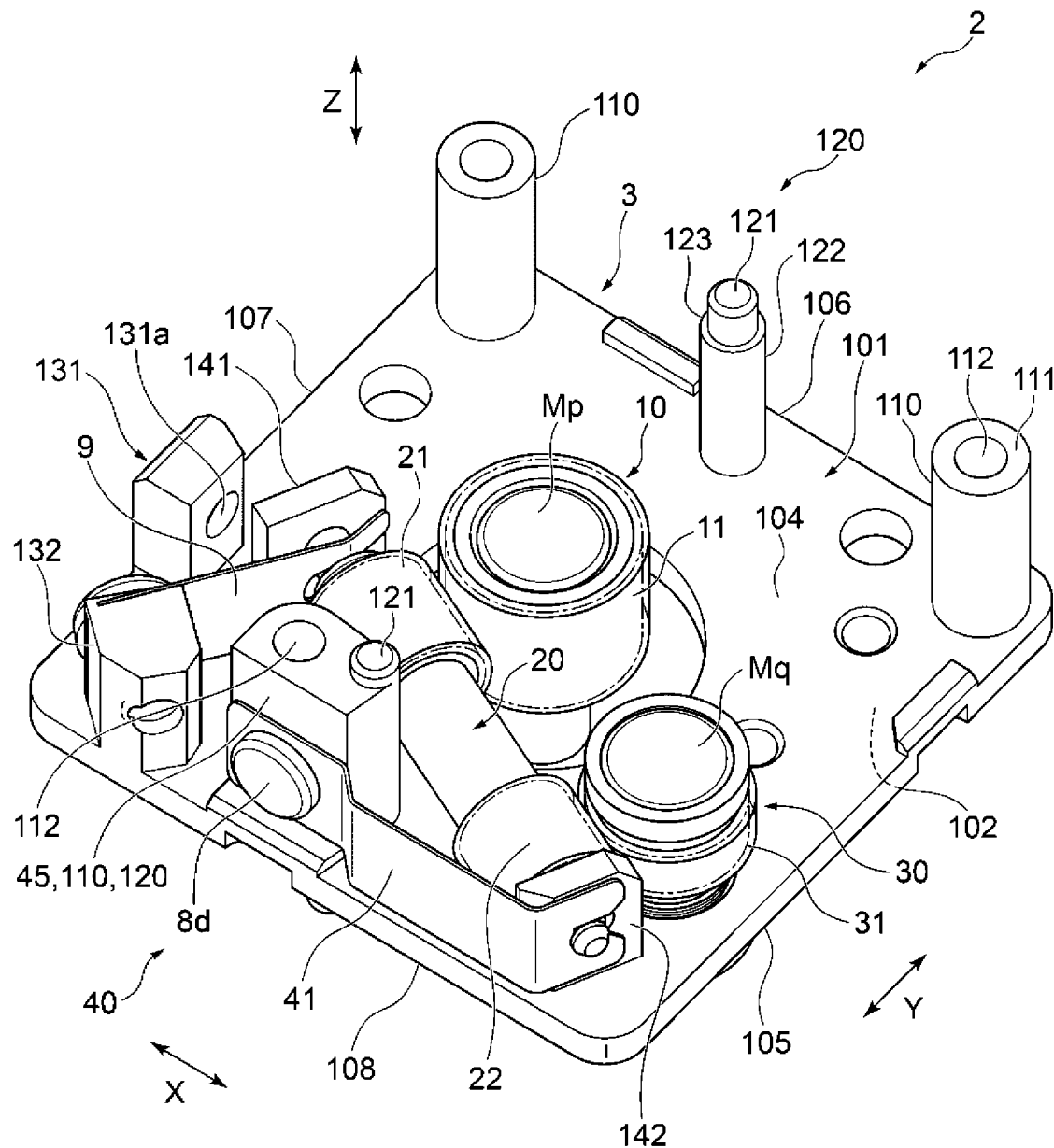
FIG. 5 is a perspective view schematically illustrating the configuration of the absolute encoder in FIG. 3 with a motor removed.
Figure 6:
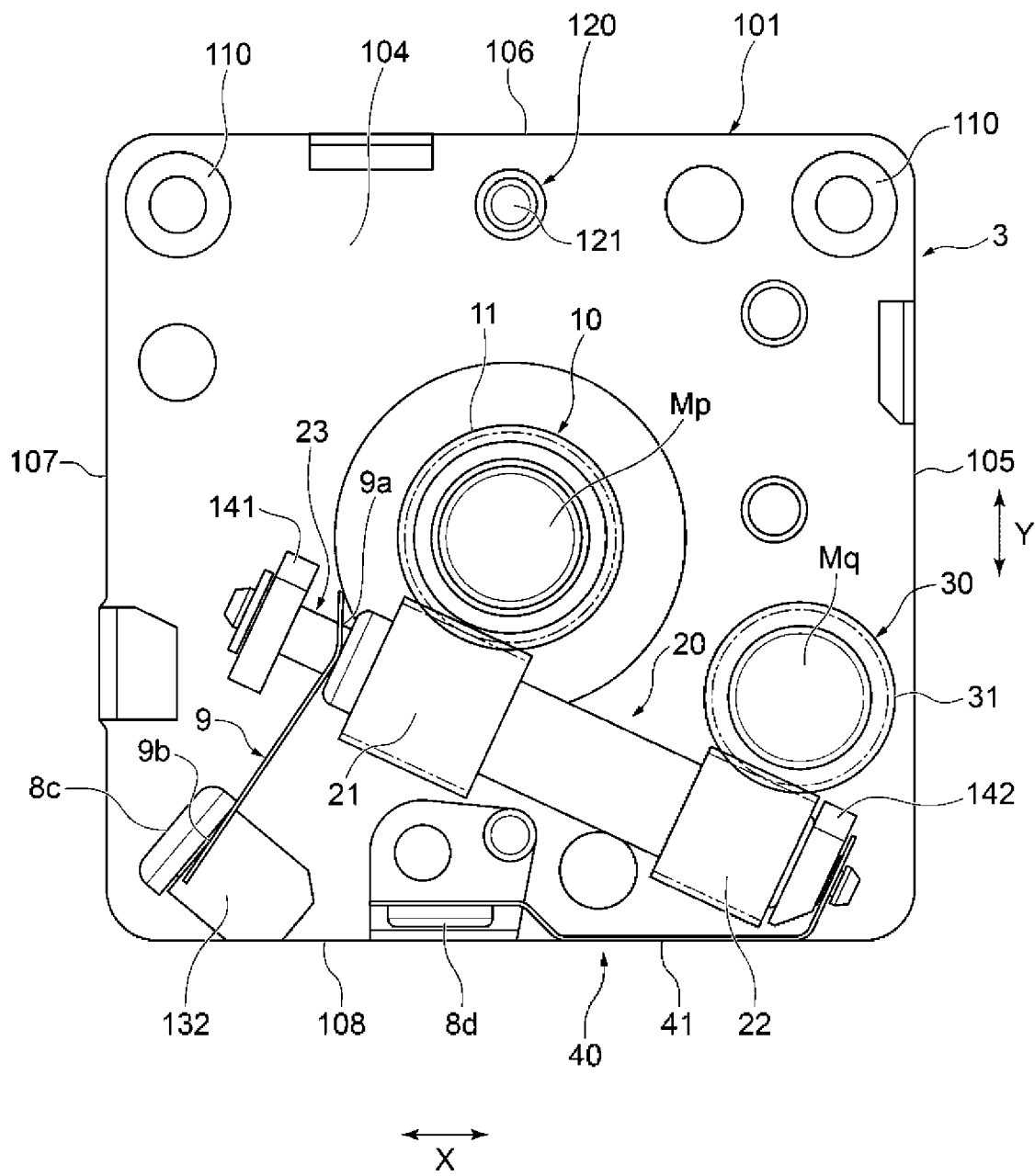
FIG. 6 is a plan view schematically illustrating the configuration of the absolute encoder in FIG. 5.

FIG. 3 is a perspective view schematically illustrating the configuration of the absolute encoder 2 in FIG. 2 with the substrate 5 and the connector 6 removed. FIG. 4 is a perspective view schematically illustrating the configuration of the absolute encoder 2 in FIG. 3 when viewed from another angle. FIG. 5 is a perspective view schematically illustrating the configuration of the absolute encoder 2 in FIG. 3 with the motor 1 removed. FIG. 6 is a plan view schematically illustrating the configuration of the absolute encoder 2 in FIG. 5.

The absolute encoder 2 includes the main shaft gear 10 including the first worm gear portion 11 (first drive gear), the intermediate gear 20 including the first worm wheel portion 21 (first driven gear) and the second worm gear portion 22 (second drive gear), a secondary shaft gear 30 including the second worm wheel portion 31 (second driven gear), a magnet Mp, an angle sensor Sp corresponding to the magnet Mp, a magnet Mq, an angle sensor Sq corresponding to the magnet Mq, and a microcomputer 51.

The main shaft 1a of the motor 1 is an output shaft of the motor 1, and is an input shaft transmitting rotational force to the absolute encoder 2. The main shaft gear 10 is fixed to the main shaft 1a of the motor 1, and is rotatably supported by a bearing member of the motor 1 integrally with the main shaft 1a. The first worm gear portion 11 is provided at the outer periphery of the main shaft gear 10 so as to rotate according to the rotation of the main shaft 1a of the motor 1. In the main shaft gear 10, the first worm gear portion 11 is provided so that the central axis of the first worm gear portion 11 coincides with or substantially coincides with the central axis of the main shaft 1a. The first worm wheel portion 21 is provided at the outer periphery of the intermediate gear 20. The first worm wheel portion 21 is provided to mesh with the first worm gear portion 11 and rotate according to the rotation of the first worm gear portion 11. The axial angle between the first worm wheel portion 21 and the first worm gear portion 11 is set to 90° or approximately 90°.

Although the outer diameter of the first worm wheel portion 21 is not particularly limited, in the illustrated example, the outer diameter of the first worm wheel portion 21 is set to be smaller than the outer diameter of the first worm gear portion 11 (see FIG. 8), and the outer diameter of the first worm wheel portion 21 is reduced. As a result, the size of the absolute encoder 2 in the up-down direction is reduced.

The second worm gear portion 22 is provided at the outer periphery of the intermediate gear 20, and rotates according to the rotation of the first worm wheel portion 21. In the intermediate gear 20, the second worm gear portion 22 is provided so that the central axis of the second worm gear portion 22 coincides with or substantially coincides with the central axis of the first worm wheel portion 21. The second worm wheel portion 31 is provided at the outer periphery of the secondary shaft gear 30. The second worm wheel portion 31 is provided to mesh with the second worm gear portion 22 and rotate according to the rotation of the second worm gear portion 22. The axial angle between the second worm wheel portion 31 and the second worm gear portion 22 is set to 90° or approximately 90°. The rotation axis line of the second worm wheel portion 31 is parallel or substantially parallel with the rotation axis line of the first worm gear portion 11.

Here, the first worm wheel portion 21 moves toward the first worm gear portion 11 to mesh with the first worm gear portion 11 in a direction. This direction is referred to as a "first meshing direction" (direction indicated by an arrow P1 in FIG. 11). Similarly, the second worm gear portion 22 moves toward the second worm wheel portion 31 to mesh with the second worm wheel portion 31 in a direction. This direction is referred to as a "second meshing direction" (direction indicated by an arrow P2 in FIG. 11). In the present embodiment, the first meshing direction P1 and the second meshing direction P2 are both a direction along a horizontal plane (XY plane).

The angle sensor Sq detects the rotation angle of the second worm wheel portion 31, that is, the rotation angle of the secondary shaft gear 30. The magnet Mq is fixed to an upper surface of the secondary shaft gear 30 such that the central axes of both the magnet Mq and the secondary shaft gear 30 coincide or substantially coincide. The magnet Mq has two magnetic poles aligned in a direction perpendicular to the rotation axis line of the secondary shaft gear 30. To detect the rotation angle of the secondary shaft gear 30, the angle sensor Sq is provided such that a lower surface of the angle sensor Sq opposes an upper surface of the magnet Mq across a gap in the up-down direction.

As an example, the angle sensor Sq is fixed to the substrate 5, and the substrate 5 is supported by substrate pillars 110 disposed at a base 3 (described later) of the absolute encoder 2. The angle sensor Sq detects the magnetic pole of the magnet Mq, and outputs the detection information to the microcomputer 51. The microcomputer 51 identifies the rotation angle of the magnet Mq, that is, the rotation angle of the secondary shaft gear 30 based on the input detection information related to the magnetic pole.

The magnet Mp is fixed to an upper surface of the main shaft gear 10 such that the central axes of both the magnet Mp and the main shaft gear 10 coincide or substantially coincide. The magnet Mp has two magnetic poles aligned in a direction perpendicular to the rotation axis line of the main shaft gear 10. To detect the rotation angle of the main shaft gear 10, the angle sensor Sp is provided such that a lower surface of the angle sensor Sp opposes an upper surface of the magnet Mp across a gap in the up-down direction.

As an example, the angle sensor Sq is fixed to a surface of the substrate 5, and the angle sensor Sp is fixed to the substrate 5 at the same surface as the surface. The angle sensor Sp detects the magnetic pole of the magnet Mp, and outputs the detection information to the microcomputer 51. The microcomputer 51 identifies the rotation angle of the main shaft gear 10, that is, the rotation angle of the main shaft 1*a* by identifying the rotation angle of the magnet Mp based on the input detection information related to the magnetic pole. The resolution of the rotation angle of the main shaft 1*a* corresponds to the resolution of the angle sensor Sp. As described later, the microcomputer 51 identifies, and outputs, the amount of rotation of the main shaft 1*a* based on the identified rotation angle of the secondary shaft gear 30 and the identified rotation angle of the main shaft 1*a*. As an example, the microcomputer 51 may output the amount of rotation of the main shaft 1*a* of the motor 1 as a digital signal.

The absolute encoder 2 configured as described above can identify the rotation speed of the main shaft 1*a* according to the rotation angle of the secondary shaft gear 30 identified based on the detection information of the angle sensor Sq, and can identify the rotation angle of the main shaft 1*a* based on the detection information of the angle sensor Sp. Then, the microcomputer 51 identifies the amount of rotation of the main shaft 1*a* over multiple rotations based on the identified rotation speed of the main shaft 1*a* and the rotation angle of the main shaft 1*a*.

The number of threads of the first worm gear portion 11 of the main shaft gear 10 provided at the main shaft 1*a* is, for example, five, and the number of teeth of the first worm wheel portion 21 is, for example, 20. In other words, the first worm gear portion 11 and the first worm wheel portion 21 constitute a first transmission mechanism R1 having a reduction ratio of 20/5=4 (see FIG. 6). When the first worm gear portion 11 rotates four times, the first worm wheel portion 21 rotates one time. Because the first worm wheel portion 21 and the second worm gear portion 22 are provided coaxially to constitute the intermediate gear 20 and rotate together, when the first worm gear portion 11 rotates four times, i.e., when the main shaft 1*a* and the main shaft gear 10 rotate four times, the intermediate gear 20 rotates one time and the second worm gear portion 22 rotates one time.

The number of threads of the second worm gear portion 22 is, for example, two, and the number of teeth of the second worm wheel portion 31 is, for example, 25. That is, the second worm gear portion 22 and the second worm wheel portion 31 constitute a second transmission mechanism R2 having a reduction ratio of 25/2=12.5 (see FIG. 6). When the second worm gear portion 22 rotates 12.5 times, the second worm wheel portion 31 rotates one time. Because the secondary shaft gear 30 formed with the second worm wheel portion 31 is configured to rotate integrally with the magnet Mq and a magnet holder 35 as will be described later, the magnet Mq rotates one time when the second worm gear portion 22 constituting the intermediate gear 20 rotates 12.5 times. As described above, when the main shaft 1*a* rotates 50 times, the intermediate gear 20 rotates 12.5 times, and the secondary shaft gear 30 and the magnet Mq rotate one time. In other words, the rotation speed of the main shaft 1*a* over 50 rotations can be identified by the detection information related to the rotation angle of the secondary shaft gear 30 of the angle sensor Sq.

Hereinafter, the configuration of the absolute encoder 2 will be described in further detail.

As described above (see FIGS. 1 to 6), the absolute encoder 2 includes the base 3, the case 4, the substrate 5, and the connector 6. The absolute encoder 2 includes the main shaft gear 10, the intermediate gear 20, the secondary shaft gear 30, and the biasing mechanism 40. The absolute encoder 2 includes the magnets Mp and Mq and the angle sensors Sp and Sq, and includes the microcomputer 51 for controlling a drive unit or detection unit of the absolute encoder 2.

The base 3 is a base rotatably holding rotating bodies such as the main shaft gear 10, the intermediate gear 20, and the secondary shaft gear 30, and fixing members such as the substrate 5 and the biasing mechanism 40. As illustrated in FIGS. 3 to 6, FIGS. 9 to 13, and others, the base 3 includes a base portion 101 and various support portions to be described below for supporting each member of the absolute encoder 2 provided at the base portion 101. The case 4 is fixed to the base 3 by hook portions at three locations, for example, and by a screw at one location. Further, the substrate 5 is configured to be fixed to the base 3 by screws at three locations, for example.

Figure 7:
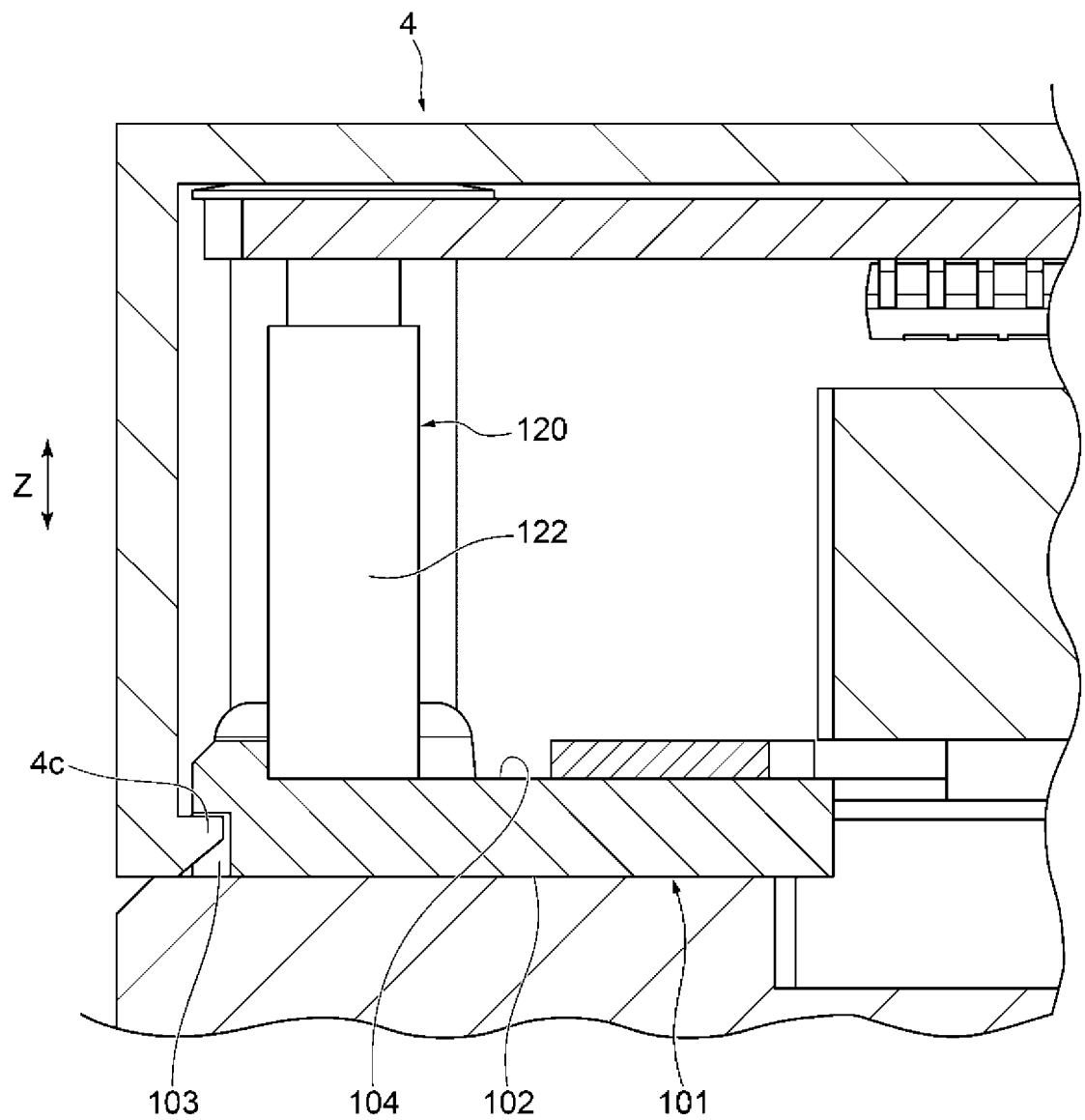
FIG. 7 is a cross-sectional view of the absolute encoder in FIG. 1 sectioned along a plane parallel to the central axis of a main shaft.

The base portion 101 is a plate-like portion having a pair of surfaces facing the up-down direction of the absolute encoder 2, and extends in the horizontal direction (X-axis direction and Y-axis direction). As illustrated in FIG. 7, recess parts 103 engageable with hook portions 4*c* formed at the case 4 are formed in a lower surface 102 at a lower side of the base portion 101. For example, three of the recess parts 103 are formed, as described above.

The substrate pillars 110 and substrate positioning pins 120 being portions for supporting the substrate 5 are provided at an upper surface 104 being a surface at the upper side of the base portion 101. The base 3 includes, for example, three of the substrate pillars 110 and two of the substrate positioning pins 120.

As illustrated in FIG. 5 and others, the substrate pillar 110 is a portion projecting upward from the upper surface 104 of the base portion 101, and is, for example, a columnar or substantially columnar portion. A screw hole 112 extending downward is formed in an upper-side end surface (an upper end surface 111) of the substrate pillar 110. The upper end surfaces 111 of the substrate pillars 110 are formed so as to extend on the same horizontal plane or extend along the same horizontal plane. In the absolute encoder 2, a lower surface 5*a* of the substrate 5 is in contact with the upper end surfaces 111 of the substrate pillars 110, and the substrate 5 is fixed to the substrate pillars 110 by screws 8*a* screwed into the screw holes 112. Note that, as described below, one of the substrate pillars 110 is integrated with a support projection 45 constituting the one substrate positioning pin 120 and the biasing mechanism 40 described below.

Figure 19:
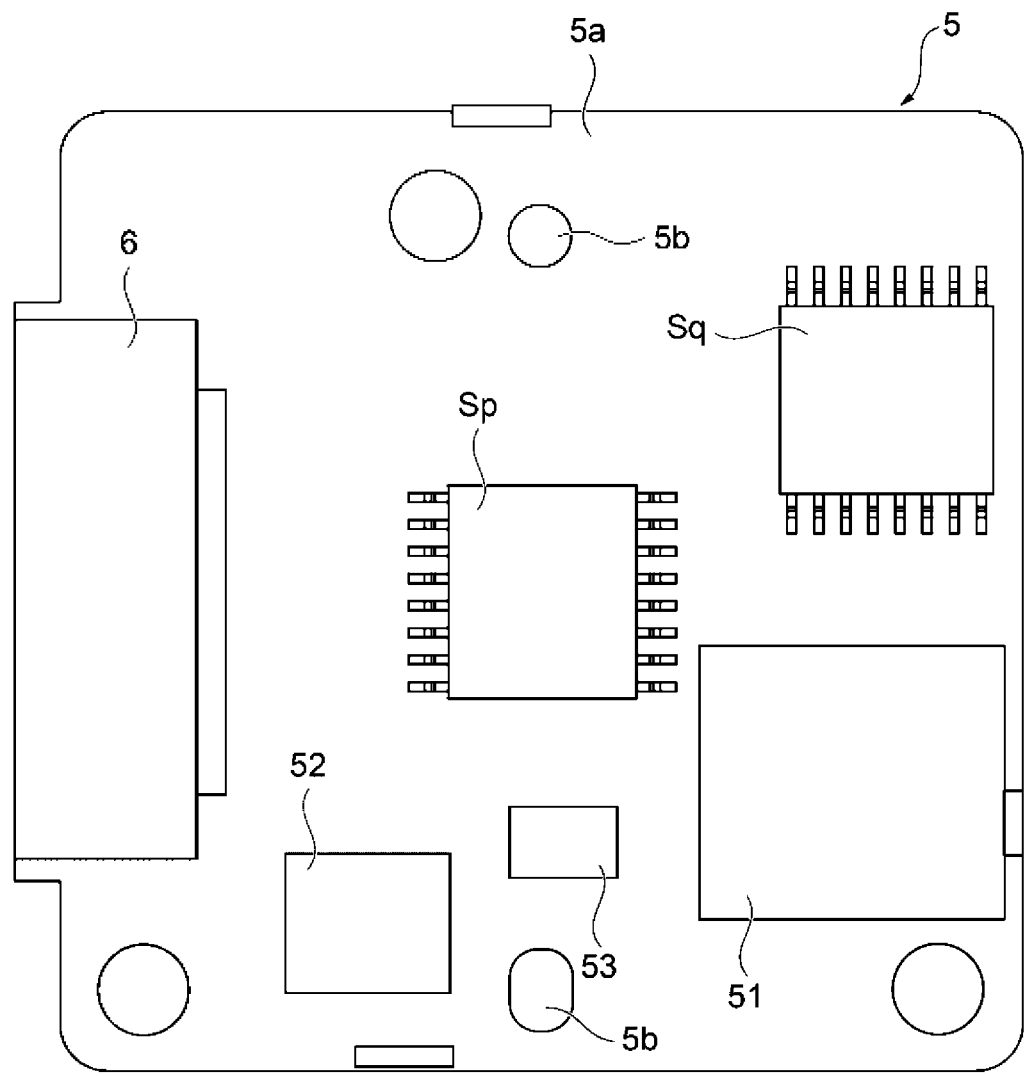
FIG. 19 is a diagram illustrating the substrate in FIG. 2 when viewed from a lower surface side.

As illustrated in FIG. 5 and others, the substrate positioning pin 120 is a portion projecting upward from the upper surface 104 of the base portion 101, and is, for example, a columnar or a substantially columnar portion. An upper end portion (a tip end portion 121) of the substrate positioning pin 120 is narrower than a portion (a base portion 122) being lower than the tip end portion 121, and a stepped surface 123 is formed between the tip end portion 121 and the base portion 122. The tip end portion 121 of the substrate positioning pin 120 can be inserted into positioning holes 5*b* formed in the substrate 5 as illustrated in FIG. 19 to be described below. The substrate 5 is positioned relative to the base 3 by inserting the tip end portions 121 of the substrate positioning pins 120 into the respective positioning holes 5*b* of the substrate 5.

As illustrated in FIG. 5 and others, the base 3 includes a support projection 131 provided at the upper surface 104 of the base portion 101 and being a portion projecting upward. A screw hole 131a extending in the horizontal direction (left-right direction in the figure) is formed in the support projection 131. A screw 8b is screwed into the screw hole 131a of the support projection 131 to fix the case 4 to the base 3 via the screw 8b.

The base 3 includes support projections 132, 141 and 142 provided at the upper surface 104 of the base portion 101 and being portions projecting upward (see FIGS. 3 to 6, etc.). The support projection 132 is a portion supporting a leaf spring 9 configured to push the intermediate gear 20 in the central axial direction of the intermediate gear 20, as described below. The support projections 141 and 142 are portions for rotatably supporting the intermediate gear 20, as described below. Furthermore, the base 3 includes a bearing holder portion 134 supporting a bearing 135 rotatably holding the secondary shaft gear 30, as described below (see FIG. 14). Additionally, the support projection 45 is formed at the upper surface 104 of the base portion 101 of the base 3. As described below, the support projection 45 is a portion constituting the biasing mechanism 40 biasing the second worm gear portion 22 in the direction of the second worm wheel portion 31, and is a portion supporting a biasing spring 41.

Next, each component of the absolute encoder 2 supported by the base 3 will be described in detail.

Main Shaft Gear

Figure 8:
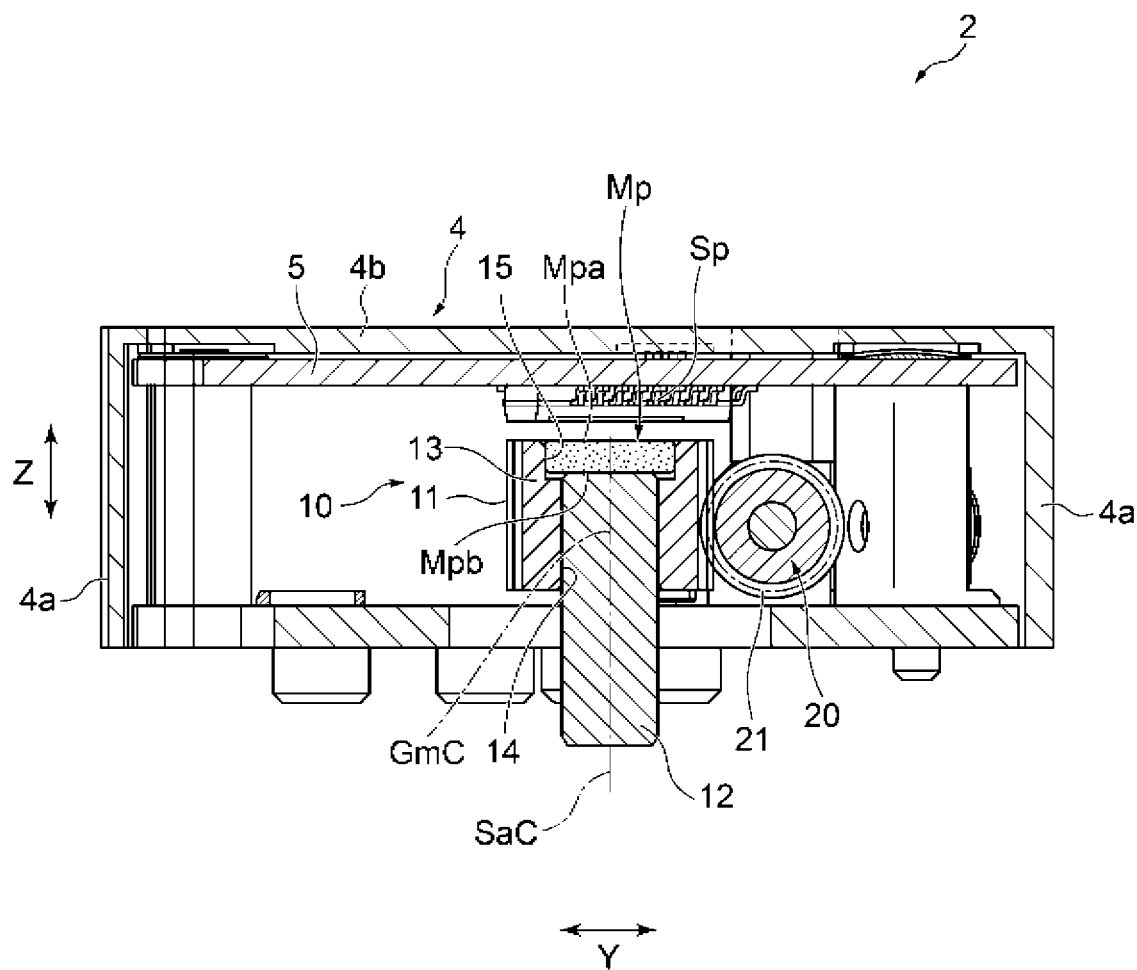
FIG. 8 is a cross-sectional view schematically illustrating the configuration of the absolute encoder in FIG. 1 with the motor removed, sectioned along a plane through the central axis of a main shaft gear and orthogonal to the central axis of an intermediate gear.
Figure 9:
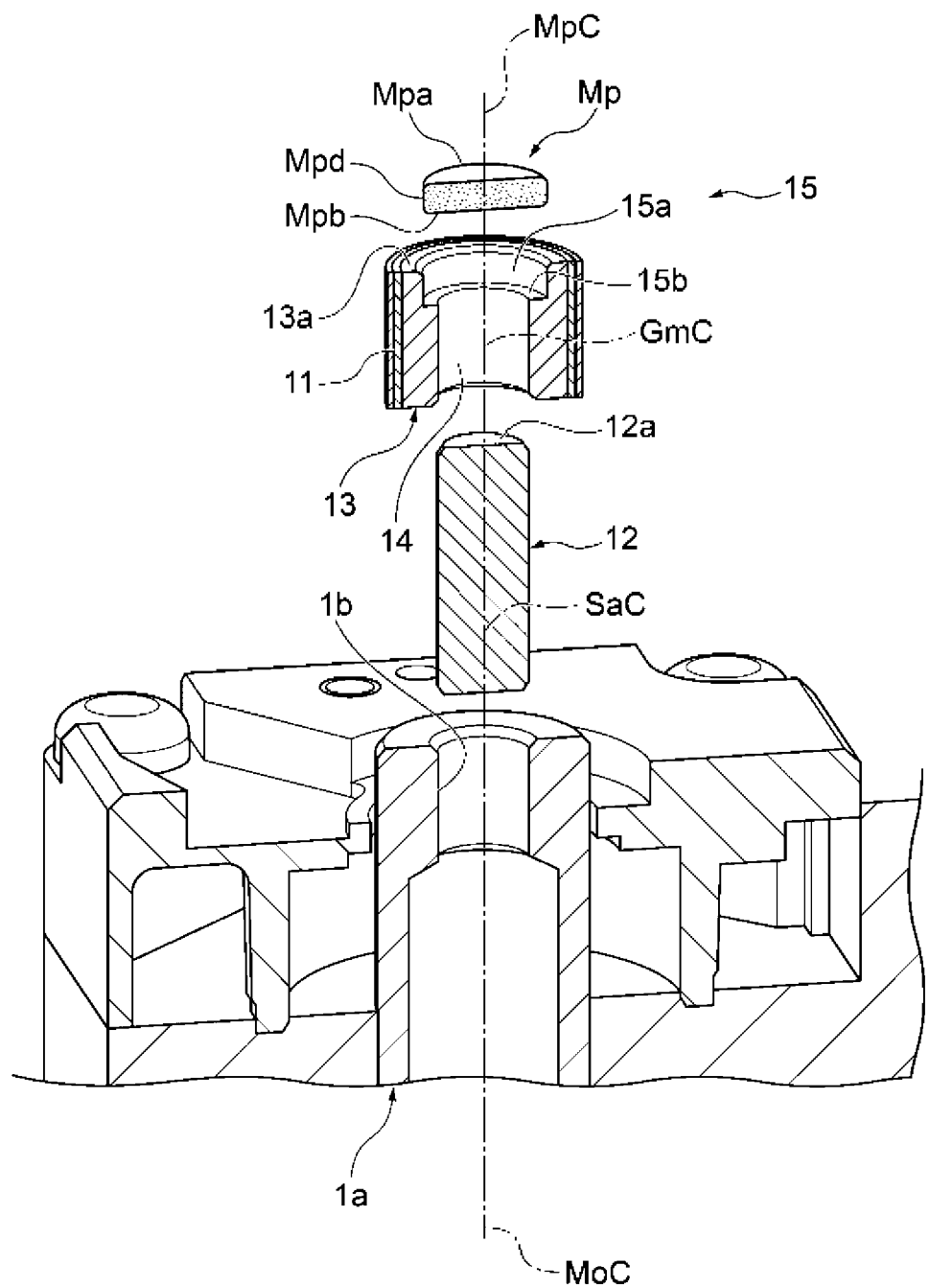
FIG. 9 is an exploded longitudinal cross-sectional view schematically illustrating a configuration of a magnet, the main shaft gear, a main shaft adapter, and a main shaft of the motor in the configuration of the absolute encoder in FIG. 8.

FIG. 8 is a cross-sectional view schematically illustrating the configuration of the absolute encoder 2 in FIG. 1 with the motor 1 removed, sectioned along a plane through the central axis of the main shaft gear 10 and orthogonal to the central axis of the intermediate gear 20. FIG. 9 is an exploded longitudinal cross-sectional view schematically illustrating the configuration of the magnet Mp, the main shaft gear 10, a main shaft adapter 12, and the main shaft 1a of the motor 1 in the configuration of the absolute encoder 2 in FIG. 8.

As illustrated in FIGS. 8 and 9, the main shaft gear 10 is a tubular member provided coaxially or substantially coaxially with the main shaft 1a of the motor 1 and the main shaft adapter 12. The main shaft gear 10 includes a tubular portion 13 having a tubular shape and the first worm gear portion 11 provided at the outer side in the radial direction of the tubular portion 13. The first worm gear portion 11 is a gear portion of the main shaft gear 10. As illustrated in FIG. 9, a press-fitting section 1b in the form of a cylindrical surface and forming a space at the inner peripheral side is formed in the upper end of the main shaft 1a of the motor 1. The press-fitting section 1b has a shape allowing the main shaft adapter 12 to be press-fitted and fixed. Further, the tubular portion 13 of the main shaft gear 10 is formed with a press-fitting section 14 in the form of a cylindrical surface and forming a space at an inner side. The press-fitting section 14 has a shape allowing the main shaft adapter 12 to be press-fitted and fixed.

As illustrated in FIGS. 8 and 9, a magnet holding portion 15 configured to hold the magnet Mp is formed in the tubular portion 13 of the main shaft gear 10. The magnet holding portion 15 is a portion forming a recess part corresponding to the shape of the magnet Mp and being recessed downward from an upper end surface 13a of the tubular portion 13. The magnet holding portion 15 can accommodate the magnet Mp. The magnet holding portion 15 has an inner peripheral surface 15a in the form of a cylindrical surface communicating with the press-fitting section 14 and having a larger diameter than the press-fitting section 14, and an annular bottom surface 15b connecting the inner peripheral surface 15a and the press-fitting section 14.

The inner peripheral surface 15a of the magnet holding portion 15 is formed to be in contact with an outer peripheral surface Mpd of the magnet Mp accommodated in the magnet holding portion 15. In the absolute encoder 2, an upper end surface 12a of the main shaft adapter 12 is positioned above the bottom surface 15b of the magnet holding portion 15. In the absolute encoder 2, a bottom surface Mpb of the magnet Mp is in contact with the upper end surface 12a of the main shaft adapter 12, and is not in contact with the bottom surface 15b of the magnet holding portion 15 of the main shaft gear 10. Thus, the magnet Mp is positioned in the up-down direction by the upper end surface 12a of the main shaft adapter 12 and positioned in the horizontal direction by the inner peripheral surface 15a of the magnet holding portion 15. The lower surface Mpb of the magnet Mp positioned in this manner is bonded and fixed to the upper end surface 12a of the main shaft adapter 12.

As described above, the magnet Mp is fixed to the main shaft adapter 12, and the magnet Mp, the main shaft gear 10, and the main shaft adapter 12 rotate integrally with the main shaft 1a of the motor 1. The magnet Mp, the main shaft gear 10, and the main shaft adapter 12 are configured to rotate about the same axis line as the main shaft 1a of the motor 1.

The first worm gear portion 11 is constituted by a teeth portion formed into a helical shape, and is formed to mesh with the first worm wheel portion 21 of the intermediate gear 20. The first worm gear portion 11 is formed of, for example, polyacetal resin. The first worm gear portion 11 is an example of a first drive gear.

As illustrated in FIG. 9, the magnet Mp is a disk-shaped or substantially disk-shaped permanent magnet inserted into the magnet holding portion 15 of the main shaft gear 10 and has an upper surface Mpa and the lower surface Mpb opposing each other. In the absolute encoder 2, the position (position in the up-down direction) of the magnet Mp in a direction of a central axis GmC of the main shaft gear 10 is defined by the upper end surface 12a of the main shaft adapter 12, as described above, so that the upper surface MPa of the magnet Mp opposes the surface of the angle sensor Sp across a certain distance in the up-down direction.

A central axis MpC of the magnet Mp (axis representing the center of the magnet Mp or axis passing through the center of a magnetic pole boundary) coincides or substantially coincides with the central axis GmC of the main shaft gear 10, a central axis SaC of the main shaft adapter 12, and a central axis MoC of the main shaft 1a of the motor 1. When these central axes are made to coincide or substantially coincide with each other, the angle sensor Sp can detect the rotation angle or the amount of rotation of the magnet Mp with higher accuracy.

Note that in the embodiment of the present invention, the two magnetic poles (N/S) of the magnet Mp are preferably formed adjacent in a horizontal plane (XY plane) perpendicular to the central axis MpC of the magnet Mp. With this configuration, the detection accuracy of the rotation angle or amount of rotation by the angle sensor Sp can be further improved. Note that the magnet Mp is formed from a magnetic material such as a ferritic material, an Nd (neodymium) —Fe (iron) —B (boron) material. The magnet Mp may be, for example, a rubber magnet or a bonded magnet including a resin binder.

Intermediate Gear

Figure 10:
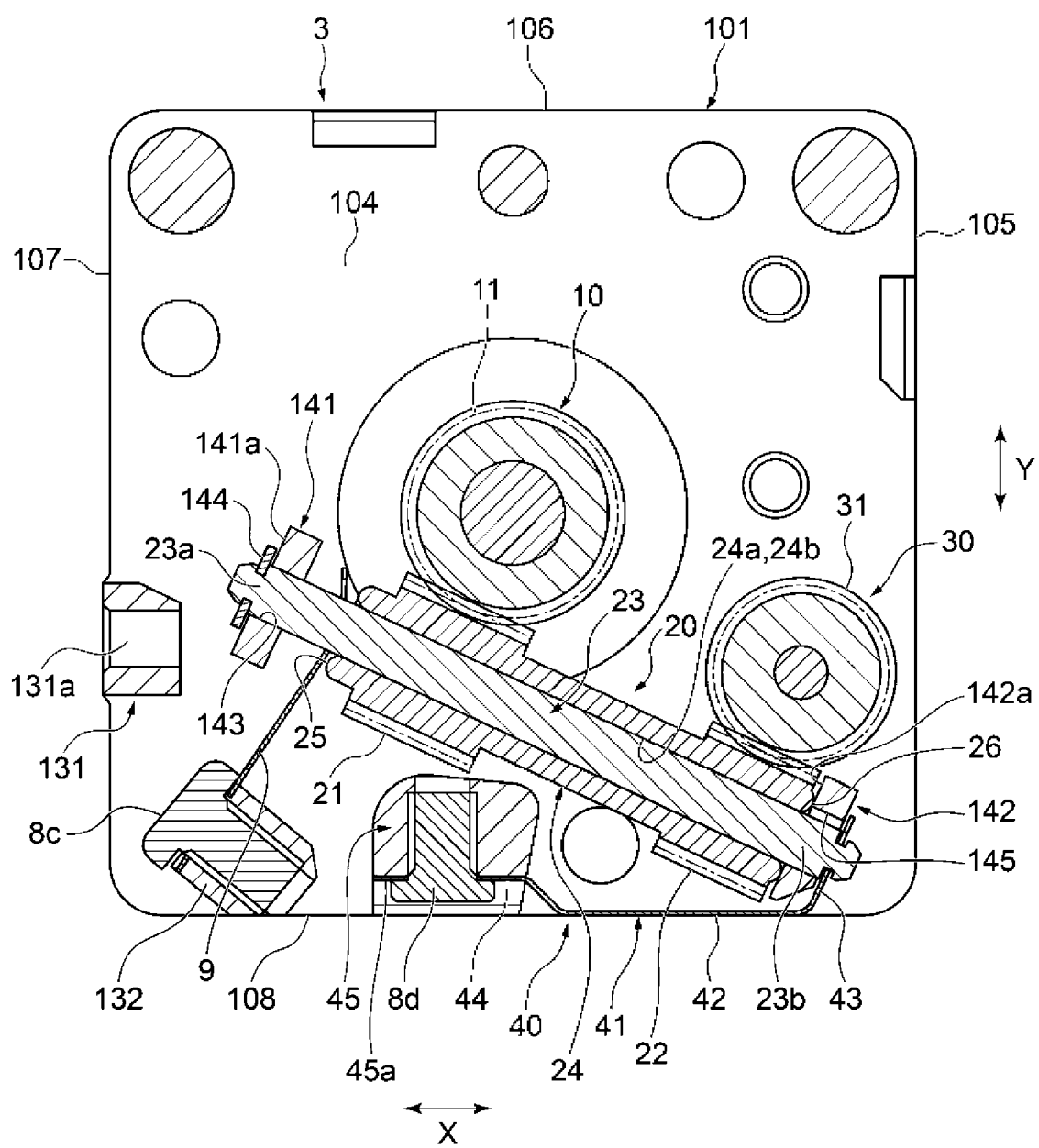
FIG. 10 is a cross-sectional view schematically illustrating the configuration of the absolute encoder in FIG. 6, sectioned along a plane through the central axis of the intermediate gear and parallel with an XY plane.
Figure 11:
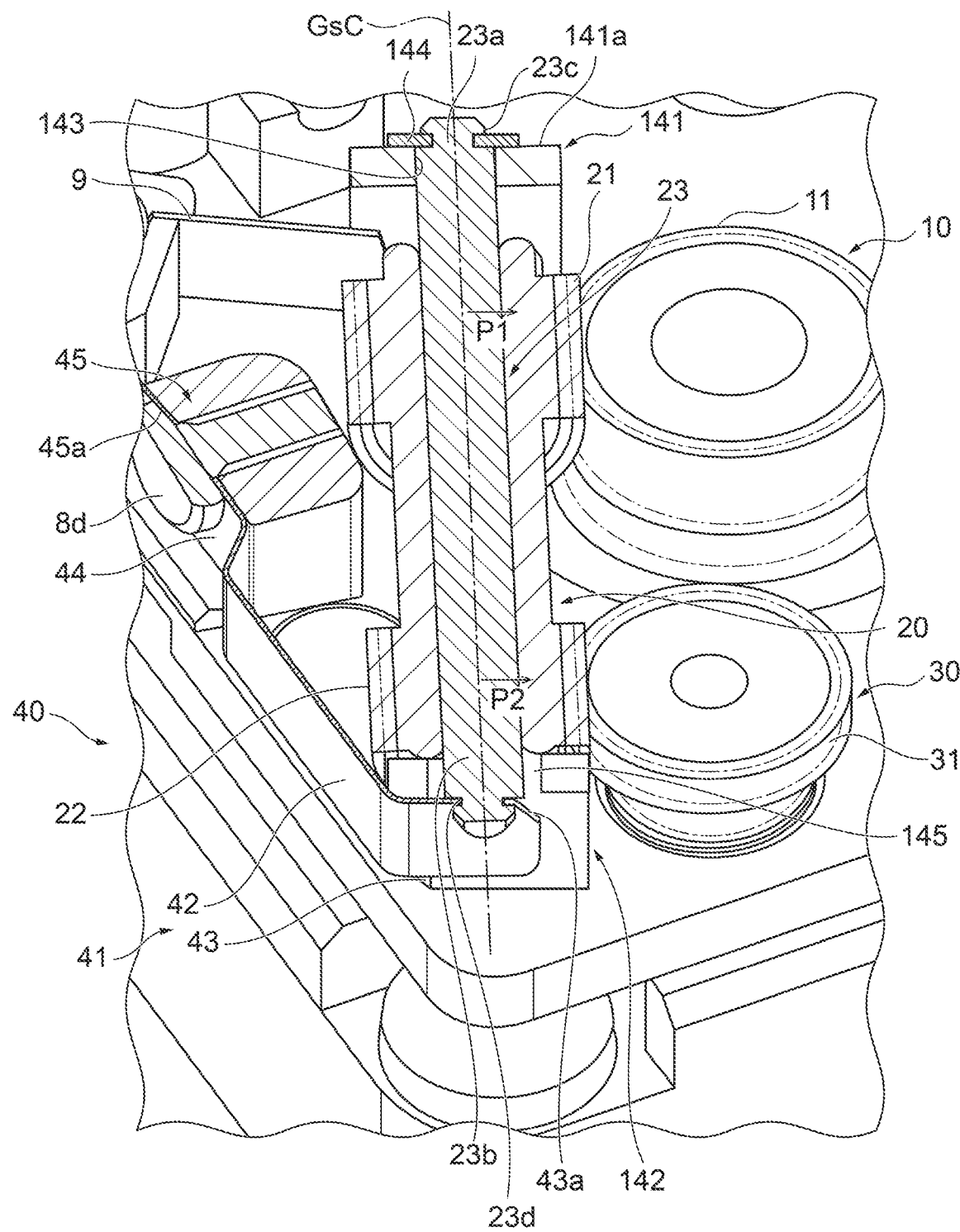
FIG. 11 is an enlarged perspective view of the cross-sectional view in FIG. 10 when viewed from another angle.
Figure 12:
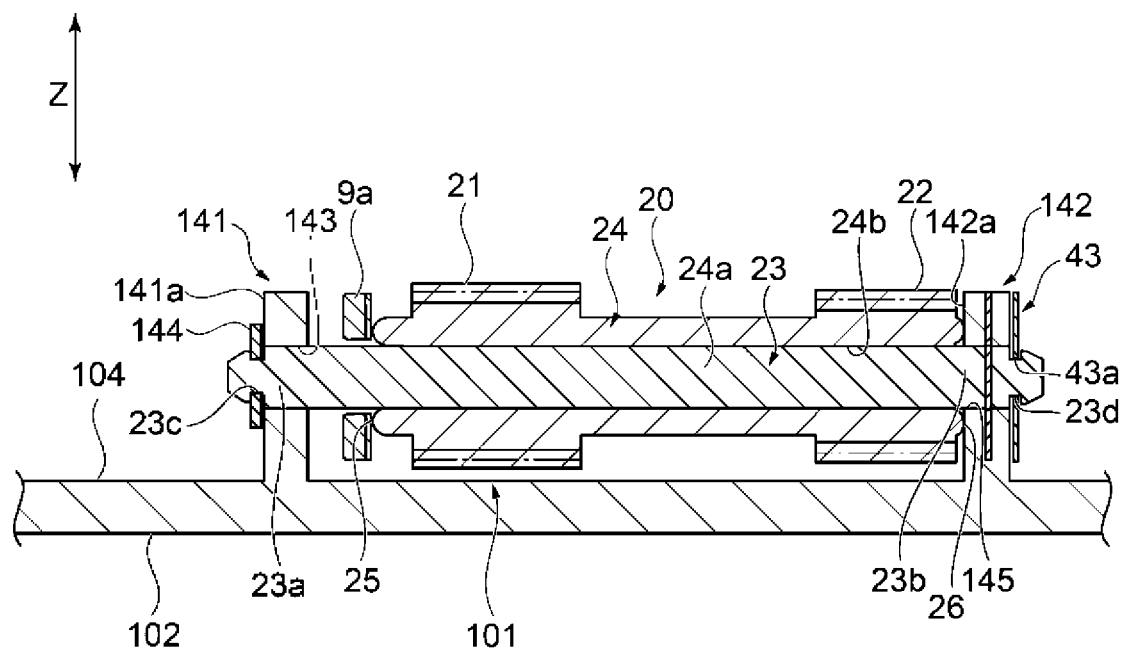
FIG. 12 is a partial cross-sectional view schematically illustrating the configuration of the absolute encoder in FIG. 6, sectioned along a plane through the central axis of the intermediate gear and orthogonal to the XY plane.

FIG. 10 is a cross-sectional view schematically illustrating the configuration of the absolute encoder 2 in FIG. 6, cut along a plane passing through the central axis of the intermediate gear 20 and parallel to the horizontal plane (XY plane). FIG. 11 is an enlarged perspective view of the absolute encoder 2 cut as illustrated in FIG. 10, seen from above and the secondary shaft-side end portion 23b side of an intermediate gear shaft 23. FIG. 12 is a partial cross-sectional view schematically illustrating the configuration of the absolute encoder 2 in FIG. 6, cut along a plane passing through a central axis of the intermediate gear 20 and orthogonal to a horizontal plane (XY plane).

As illustrated in FIGS. 4 to 6 and FIGS. 10 to 12, the intermediate gear 20 is rotatably supported by the intermediate gear shaft 23 at the upper side of the base portion 101 of the base 3. The intermediate gear shaft 23 extends parallel to the horizontal plane. Additionally, the intermediate gear shaft 23 is not parallel to the left-right direction (X-axis direction) and the front-rear direction (Y-axis direction) in a plan view. In other words, the intermediate gear shaft 23 is inclined with respect to the left-right direction and the front-rear direction. The intermediate gear shaft 23 being inclined with respect to the left-right direction and the front-rear direction means that the intermediate gear shaft 23 extends obliquely with respect to outer peripheral surfaces 105 to 108 of the base portion 101 of the base 3 (see FIG. 10). In the absolute encoder 2, the intermediate gear shaft 23 is supported by the base portion 101 of the base 3 by the support projection 141 located at the main shaft gear 10 side and the support projection 142 located at the secondary shaft gear 30 side.

As illustrated in FIG. 10, the outer peripheral surface of the base 3 is constituted by the right-side outer peripheral surface 105 and the left-side outer peripheral surface 107 parallel to the YZ plane, and the rear-side outer peripheral surface 106 and the front-side outer peripheral surface 108 parallel to the XZ plane and extending between the right-side outer peripheral surface 105 and the left-side outer peripheral surface 107. The right-side outer peripheral surface 105 is a side surface provided at the right side (right side in the X-axis direction) of the base 3. The left-side outer peripheral surface 107 is a side surface provided at the left side (left side in the X-axis direction) of the base 3. The rear-side outer peripheral surface 106 is a side surface provided at the rear side (rear side in the Y-axis direction) of the base 3. The front-side outer peripheral surface 108 is a side surface provided at the front side (front side in the Y-axis direction) of the base 3.

As illustrated in FIGS. 3 to 6, the dimensions of the absolute encoder 2 in a plan view are aligned with the dimensions of the motor 1 being 25 mm square. Thus, because the intermediate gear 20 disposed parallel to the upper surface 104 of the base 3 is provided to extend obliquely with respect to the outer peripheral surfaces 105 to 108 of the base 3, the dimensions of the absolute encoder 2 in the horizontal direction can be reduced. Note that the horizontal direction is a direction equal to a direction orthogonal to the central axis of the main shaft 1a of the motor 1, and is a direction equal to the direction parallel to the XY plane.

As illustrated in FIGS. 5 and 6, and FIGS. 10 to 13, the intermediate gear 20 is a tubular member formed rotatably about the intermediate gear shaft 23, and includes the first worm wheel portion 21, the second worm gear portion 22, a tubular portion 24, a main shaft-side sliding portion 25, and a secondary shaft-side sliding portion 26. The tubular portion 24 is a member extending in a tubular shape and has an inner peripheral surface 24b forming a through-hole 24a. The intermediate gear shaft 23 can be inserted into the through-hole 24a. The through-hole 24a is a space surrounded by the inner peripheral surface 24b of the tubular portion 24. The inner peripheral surface 24b is formed in a slidable manner at the outer peripheral surface of the intermediate gear shaft 23, being inserted through the through-hole 24a. Further, the intermediate gear 20 is supported by the intermediate gear shaft 23 rotatably about the intermediate gear shaft 23. The intermediate gear 20 is an integrally formed member made of metal, resin, or the like. In this embodiment, the intermediate gear 20 is formed of polyacetal resin as an example.

As illustrated in FIGS. 5 to 8, the first worm wheel portion 21 is a gear meshing with the first worm gear portion 11 of the main shaft gear 10. The first worm wheel portion 21 is an example of a first driven gear. The first worm wheel portion 21 is provided at one end portion side of the tubular portion 24 of the intermediate gear 20, and is constituted by a plurality of teeth provided at a cylindrical surface formed at one end portion side of the tubular portion 24 of the intermediate gear 20, for example. In the absolute encoder 2, the intermediate gear 20 is provided such that the first worm wheel portion 21 is located near the center of the base portion 101 of the base 3. Accordingly, the one end portion of the tubular portion 24 provided in the vicinity of the first worm wheel portion 21 is an end portion of the intermediate gear 20 at the main shaft gear 10 side.

As illustrated in FIG. 8, the outer diameter of the first worm wheel portion 21 is smaller than the outer diameter of the first worm gear portion 11. The central axis of the first worm wheel portion 21 is coaxial or substantially coaxial with the central axis of the inner peripheral surface 24b of the tubular portion 24. In the absolute encoder 2, because the central axis of the first worm wheel portion 21 is parallel with the upper surface 104 of the base portion 101 of the base 3, the outer diameter of the first worm wheel portion 21 is decreased, and thus the size of the absolute encoder 2 in the up-down direction (height direction) can be reduced.

As illustrated in FIGS. 5 and 6, FIGS. 10 to 14 and others, the second worm gear portion 22 is formed by a teeth portion formed into a helical shape, and is disposed coaxially or substantially coaxially with the first worm wheel portion 21. The second worm gear portion 22 is an example of a second drive gear. Specifically, the second worm gear portion 22 is provided at the other end portion side of the tubular portion 24, and is constituted by the teeth portion formed into a helical shape provided at a cylindrical surface formed at the other end portion side of the tubular portion 24, for example. The other end portion side of the tubular portion 24 is a side of the end portion of the intermediate gear 20 at the secondary shaft gear 30 side. Additionally, the central axis of the second worm gear portion 22 is coaxial or substantially coaxial with the central axis of the inner peripheral surface 24b of the tubular portion 24. When the second worm gear portion 22 meshes with the second worm wheel portion 31 provided at the secondary shaft gear 30, the rotational force of the intermediate gear 20 is transmitted to the secondary shaft gear 30.

As described above, the axial angle between the first worm gear portion 11 and the first worm wheel portion 21 is 90° or substantially 90°, and the central axis of the first worm gear portion 11 and the central axis of the first worm wheel portion 21 are orthogonal or substantially orthogonal to each other when viewed from a direction perpendicular to the central axis of the first worm gear portion 11 and perpendicular to the central axis of the first worm wheel portion 21. Similarly, the axial angle between the second worm gear portion 22 and the second worm wheel portion 31 is 90° or substantially 90°, and the central axis of the second worm gear portion 22 and the central axis of the second worm wheel portion 31 are orthogonal or substantially orthogonal to each other when viewed from a direction perpendicular to the central axis of the second worm gear portion 22 and perpendicular to the central axis of the second worm wheel portion 31.

Figure 14:
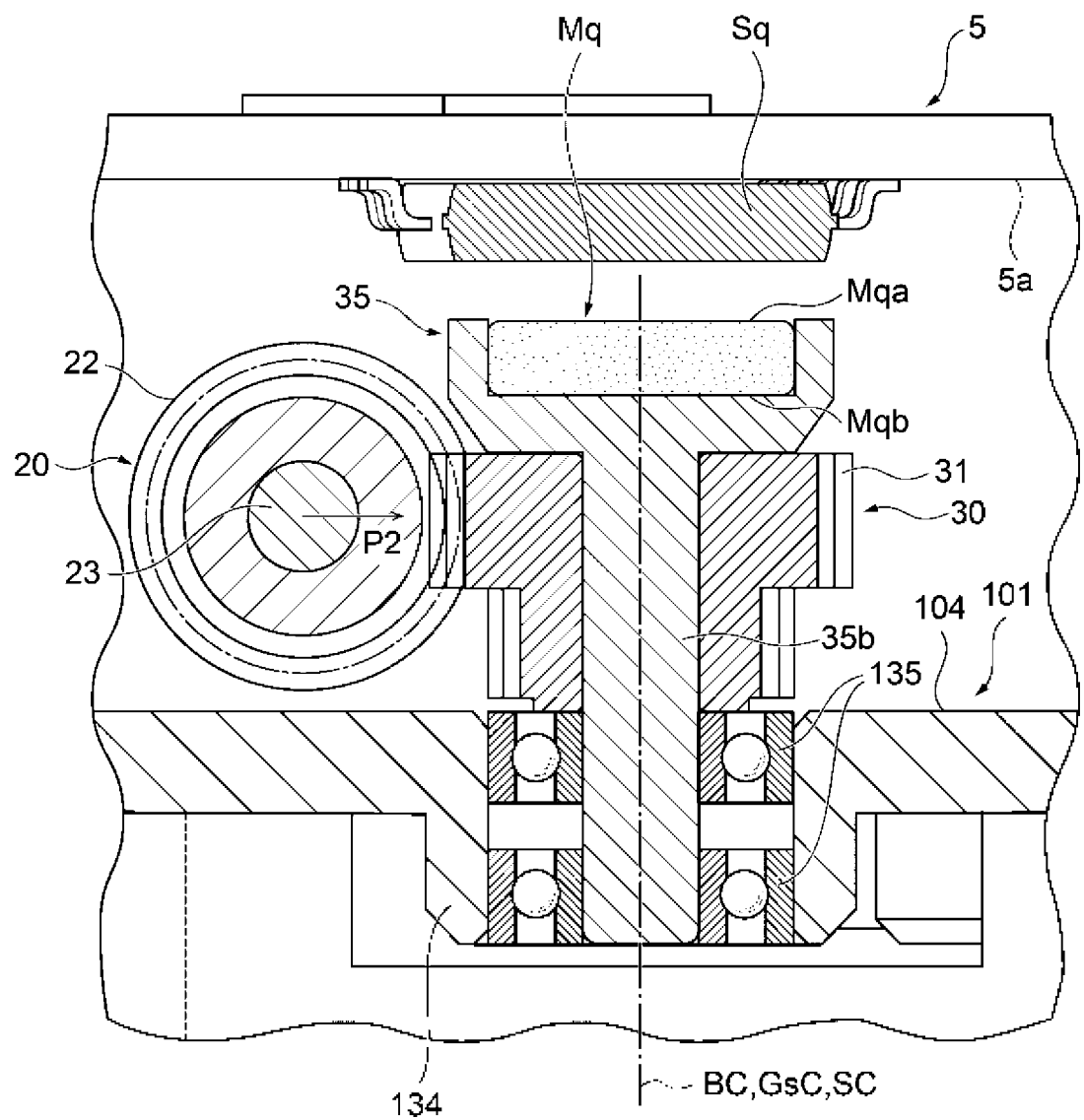
FIG. 14 is a partial cross-sectional view schematically illustrating the configuration of the absolute encoder in FIG. 2, sectioned along a plane through the central axis of a secondary shaft gear and orthogonal to the central axis of the intermediate gear.

As illustrated in FIG. 14, the outer diameter of the second worm gear portion 22 is set to the smallest possible value to achieve miniaturization of the absolute encoder 2 in the up-down direction (height direction).

As illustrated in FIG. 6 and FIGS. 10 to 12, the main shaft-side sliding portion 25 of the intermediate gear 20 is provided at an end of the intermediate gear 20, that is, at an end of the intermediate gear 20 at the main shaft gear 10 side. Specifically, the main shaft-side sliding portion 25 is an end surface of one end of the tubular portion 24, and is an annular surface facing the central axial direction of the intermediate gear 20 formed at one end of the tubular portion 24. In the absolute encoder 2, the main shaft-side sliding portion 25 of the intermediate gear 20 is in contact with a first end 9a of the leaf spring 9 to be described later.

The leaf spring 9 is an example of an elastic member and is made of metal, for example. The leaf spring 9 is a member for pushing the intermediate gear 20 in the central axial direction of the intermediate gear shaft 23 in the absolute encoder 2, and as illustrated in FIGS. 4 to 6 and FIG. 12, a second end 9b of the leaf spring 9 is fixed to the support projection 132 of the base 3 by a screw 8c to be supported by the base 3. The first end 9a of the leaf spring 9 is formed to be in contact with the main shaft-side sliding portion 25 of the intermediate gear 20. Specifically, as illustrated in FIGS. 4 and 12, the first end 9a of the leaf spring 9 is constituted by a branched portion divided into two prongs. A gap greater than the diameter of the intermediate gear shaft 23 is formed between the two branched portions constituting the first end 9a of the leaf spring 9. In this way, in the absolute encoder 2, the two branched portions of the first end 9a of the leaf spring 9 pass through the intermediate gear shaft 23 and are in contact with the main shaft-side sliding portion 25 of the intermediate gear 20.

As illustrated in FIGS. 4, 6, 10, and 12, the leaf spring 9 is fixed to the support projection 132 of the base 3 at the second end 9b such that the first end 9a is in contact with the main shaft-side sliding portion 25 of the intermediate gear 20 in a state of leaf spring 9 being deflected in the absolute encoder 2. Thus, an elastic force is generated in the leaf spring 9, and the main shaft-side sliding portion 25 of the intermediate gear 20 is pressed by the first end 9a of the leaf spring 9. This pressing force of the leaf spring 9 biases the intermediate gear 20 in a direction from the support projection 141 at the main shaft gear 10 side toward the support projection 142 at the secondary shaft gear 30 side along the intermediate gear shaft 23. When the intermediate gear 20 rotates in this state, the main shaft-side sliding portion 25 of the intermediate gear 20 rotates while in contact with the first end 9a of the leaf spring 9.

As illustrated in FIGS. 4 and 6, and FIGS. 10 to 13, the secondary shaft-side sliding portion 26 of the intermediate gear 20 is provided at the other end of the intermediate gear 20, that is, at an end of the intermediate gear 20 at the secondary shaft gear 30 side. Specifically, the secondary shaft-side sliding portion 26 is an end surface of the other end of the tubular portion 24, and is an annular surface facing the central axial direction of the intermediate gear 20 formed at the other end of the tubular portion 24, and opposes the main shaft-side sliding portion 25 in the central axial direction of the intermediate gear 20.

In the absolute encoder 2, the secondary shaft-side sliding portion 26 of the intermediate gear 20 is in contact with the support projection 142, and the support projection 142 defines the position of the intermediate gear 20 in the central axial direction of the intermediate gear shaft 23. As described above, because the intermediate gear 20 is pressed by the leaf spring 9 in a direction from the support projection 141 at the main shaft gear 10 side toward the support projection 142 at the secondary shaft gear 20 side, the secondary shaft-side sliding portion 26 of the intermediate gear 20 is also pressed in the same direction to be in contact with the support projection 142. In this manner, the pressing force of the leaf spring 9 is transmitted from the secondary shaft gear 30 to the support projection 142, and the intermediate gear 20 is stably supported in the direction from the support projection 141 toward the support projection 142. When the intermediate gear 20 rotates, the secondary shaft-side sliding portion 26 of the intermediate gear 20 rotates while being in contact with the support projection 142.

The support projection 141 and the support projection 142 are an example of a first shaft support portion and a second shaft support portion rotatably holding the intermediate gear 20 via the intermediate gear shaft 23, respectively. As illustrated in FIGS. 5 and 6 and FIGS. 10 to 12, the support projection 141 and the support projection 142 form a pair and are substantially rectangular portions projecting upward from the base portion 101 of the base 3, for example. The support projection 141 is formed near the main shaft gear 10, near the left side of the base 3 and near the center of the base 3 in the front-rear direction in a plan view (see FIGS. 6 and 10). Additionally, the support projection 142 is formed near the secondary shaft gear 30, at the right side and the front side of the base 3 in a plan view.

As illustrated in FIGS. 6 and FIGS. 10 to 12, the support projection 141 and the support projection 142 function as a support member slidably supporting the intermediate gear shaft 23 along a horizontal plane, that is, function as a support member slidably supporting the intermediate gear 20 along a horizontal plane. The intermediate gear shaft 23 is a columnar rod-like member, and includes a main shaft-side end portion 23a as a first end portion and a secondary shaft-side end portion 23b as a second end portion. The main shaft-side end portion 23a is an end portion of the intermediate gear shaft 23 located at the main shaft gear 10 side in the absolute encoder 2, and the secondary shaft-side end portion 23b is an end portion of the intermediate gear shaft 23 located at the secondary shaft gear 30 side in the absolute encoder 2.

By the biasing mechanism 40 to be described later, the first worm wheel portion 21 provided at the main shaft-side end portion 23a side of the intermediate gear shaft 23 can be moved in the first meshing direction (direction indicated by the arrow P1 in FIG. 11), but cannot be moved in the extension direction the intermediate gear shaft 23 (central axial direction of the intermediate gear shaft 23) and a direction orthogonal to the first meshing direction P1 (up-down direction). As described above, the first worm wheel portion 21 moves toward the first worm gear portion 11 to mesh with the first worm gear portion 11 in a direction. This direction is the first meshing direction.

As illustrated in FIGS. 10 to 13, a through-hole 143 is formed in the support projection 141. The main shaft-side end portion 23a of the intermediate gear shaft 23 is inserted into the through-hole 143. In a cross section orthogonal to the extension direction of the through-hole 143, the through-hole 143 has a round hole shape. The round hole shape is a shape having a perfect circle or a substantially perfect circle profile.

The absolute encoder 2 further includes a snap ring 144 as a fixing portion formed engageable with the main shaft-side end portion 23a of the intermediate gear shaft 23. The snap ring 144 is a member forming a portion in the main shaft-side end portion 23a of the intermediate gear shaft 23 that cannot pass through the through-hole 143 of the support projection 141, and is a member partially increasing the outer diameter of the main shaft-side end portion 23a of the intermediate gear shaft 23. As illustrated in FIGS. 11 and 12, the snap ring 144 is an annular member such as an E-ring locking into a groove 23c formed in the intermediate gear shaft 23. In the absolute encoder 2, the groove 23c is formed in the main shaft-side end portion 23a of the intermediate gear shaft 23 such that the snap ring 144 is positioned at the side opposite to the secondary shaft-side end portion 23b side relative to the support projection 141. That is, the snap ring 144 is disposed in contact with an outer side surface 141a of the support projection 141. The outer side surface 141a is a surface of the support projection 141 facing a side opposite to the support projection 142 side. With this configuration, the movement of the intermediate gear shaft 23 is restricted in a direction from the main shaft-side end portion 23a toward the secondary shaft-side end portion 23b due to contact with the outer side surface 141a of the support projection 141 and the snap ring 144.

By the biasing mechanism 40 to be described later, the second worm gear portion 22 provided at the secondary shaft-side end portion 23b side of the intermediate gear shaft 23 can be moved in the second meshing direction (direction indicated by the arrow P2 in FIG. 11), and the intermediate gear shaft 23 cannot be moved in the extending direction of the intermediate gear shaft 23 (central axial direction of the intermediate gear shaft 23) and a direction orthogonal to the second meshing direction P2 (Z-axis direction). As described above, the second worm gear portion 22 moves toward the second worm wheel portion 31 to mesh with the second worm wheel portion 31 in a direction. This direction is the second meshing direction.

A through-hole 145 is formed in the support projection 142. The secondary shaft-side end portion 23b of the intermediate gear shaft 23 is inserted into the through-hole 145. In a cross section orthogonal to the extension direction of the through-hole 145, the through-hole 145 has a long hole shape. The long hole shape of the through-hole 145 has a major axis and a minor axis orthogonal to the major axis. The major axis-side width is greater than the minor axis-side width. The major axis-side width of the long hole shape of the through-hole 145 in the support projection 142 at the secondary shaft gear 30 side is greater than the diameter of the outer peripheral surface of the intermediate gear shaft 23. Additionally, the minor axis-side width of the through-hole 145 is identical or substantially identical to the diameter of the outer peripheral surface of the intermediate gear shaft 23. In the absolute encoder 2, the major axis direction of the through-hole 145 in the support projection 142 is parallel or substantially parallel with the horizontal plane. As will be described later, the biasing spring 41 engages with the intermediate gear shaft 23. In the intermediate gear shaft 23, the secondary shaft-side end portion 23b of the intermediate gear shaft 23 is inserted into the through-hole 145 of the support projection 142. The biasing spring 41 is configured to bias the secondary shaft-side end portion 23b of the intermediate gear shaft 23 in the second meshing direction P2.

In this way, by the biasing mechanism 40, the support projection 141, and the support projection 142 to be described later, the intermediate gear shaft 23 is configured such that the secondary shaft-side end portion 23b can move parallel or substantially parallel with the horizontal direction with the main shaft-side end portion 23a as a fulcrum (center of oscillation), and the second worm gear portion 22 at the secondary shaft-side end portion 23b side can move parallel or substantially parallel with the horizontal direction over a larger width than the first worm wheel portion 21 at the main shaft-side end portion 23a side. With this configuration, the intermediate gear shaft 23, that is, the intermediate gear 20 biased by the biasing mechanism 40 and supported by the support projection 141 and the support projection 142 can oscillate along a horizontal plane (XY plane).

In such a configuration, the amount of movement (amount of oscillation) of the intermediate gear shaft 23 is determined by the depth of the through-hole 143 formed in the support projection 141, that is, the thickness of the support projection 141 in the central axial direction of the intermediate gear shaft 23, the clearance between the through-hole 143 and the intermediate gear shaft 23, and the major axis-side width of the through-hole 145. However, when the clearance between the through-hole 143 and the intermediate gear shaft 23 is large, the intermediate gear shaft 23 is subject to more backlash and becomes misaligned. Therefore, this clearance is preferably kept small. In order to solve this, forming the support projection 141 of a thin plate or the like to reduce the thickness of the support projection 141, that is, to make the through-hole 143 shallower makes it possible to ensure the amount of movement of the intermediate gear shaft 23 while the clearance between the through-hole 143 and the intermediate gear shaft 23 is kept small. Note that the amount of movement of the intermediate gear shaft 23 can be defined by the major axis-side width of the through-hole 145 by setting the amount of movement of the intermediate gear shaft 23 based on the thickness of the support projection 141 larger than the amount of movement of the intermediate gear shaft 23 based on the major axis-side width of the through-hole 145.

Secondary Shaft Gear

Figure 15:
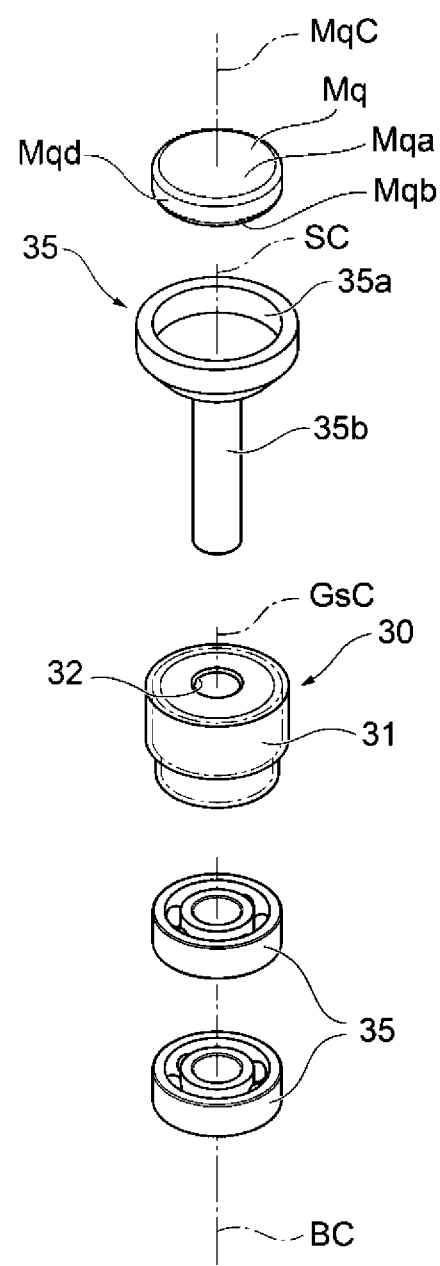
FIG. 15 is an exploded perspective view schematically illustrating the configuration of the absolute encoder in FIG. 14 with the magnet, a magnet holder, the secondary shaft gear, and a bearing disassembled.

FIG. 14 is a partial cross-sectional view schematically illustrating the configuration of the absolute encoder 2 in FIG. 2 cut along a plane passing through the central axis of the secondary shaft gear 30 and is orthogonal to the central axis of the intermediate gear 20. FIG. 15 is an exploded perspective view schematically illustrating the configuration of the absolute encoder 2 in FIG. 14 with the magnet Mq, the magnet holder 35, the secondary shaft gear 30, and the bearing 135 disassembled.

As illustrated in FIGS. 14 and 15, the secondary shaft gear 30 is a cylindrical member. In the secondary shaft gear 30, a shaft portion 35b of the magnet holder 35 is press-fitted and fixed to the magnet holder 35. The secondary shaft gear 30 includes the second worm wheel portion 31 and a through-hole 32. The secondary shaft gear 30 is an integrally formed member made of metal or resin. In this embodiment, the secondary shaft gear 30 is formed of a polyacetal resin as an example.

The second worm wheel portion 31 is a gear meshing with the second worm gear portion 22 of the intermediate gear 20. The second worm wheel portion 31 is an example of a second driven gear. The second worm wheel portion 31 is composed of, for example, a plurality of teeth provided at the outer peripheral portion of the upper-side cylindrical portion of the secondary shaft gear 30. When the intermediate gear 20 rotates, the rotational force of the intermediate gear 20 is transmitted to the secondary shaft gear 30 via the second worm gear portion 22 and the second worm wheel portion 31 of the intermediate gear 20.

As illustrated in FIGS. 14 and 15, the through-hole 32 is a hole extending along the central axis of the cylindrical secondary shaft gear 30. The shaft portion 35b of the magnet holder 35 is press-fitted into the through-hole 32, and the secondary shaft gear 30 is configured to rotate integrally with the magnet holder 35.

The magnet holder 35 includes a magnet holding portion 35a and the shaft portion 35b. The magnet holder 35 is an integrally formed member made of metal or resin. In this embodiment, the magnet holder 35 is formed of non-magnetic stainless steel as an example. The outer rings of two of the bearings 135 are press-fitted into the inner peripheral surface of the tubular bearing holder portion 134 formed in the base 3. The shaft portion 35b of the magnet holder 35 is a columnar member. The shaft portion 35b is press-fitted into the through-hole 32 of the secondary shaft gear 30, and the lower portion of the shaft portion 35b is inserted into inner rings of the two bearings 135. Accordingly, the magnet holder 35 is supported on the base 3 by the two bearings 135, and rotates together with the secondary shaft gear 30. The magnet holder 35 is rotatably held by the bearing holder portion 134 via the bearing 135 about a rotation axis line parallel to the Z-axis.

Additionally, the magnet holding portion 35a is provided at the upper end of the magnet holder 35. The magnet holding portion 35a is a bottomed cylindrical member. The magnet holding portion 35a has a depression recessed from the upper end surface of the magnet holder 35 toward the lower side. The inner peripheral surface of the depression in the magnet holding portion 35a is formed to be in contact with an outer peripheral surface Mqd of the magnet Mq. In the absolute encoder 2 configured in this way, the magnet Mq is fixed to the magnet holding portion 35a by being accommodated in the depression of the magnet holding portion 35a.

Because the shaft portion 35b of the magnet holder 35 is supported by the two bearings 135 disposed in the bearing holder portion 134 formed in the base 3, the magnet holder 35 can be prevented from tilting. Further, disposing the two bearings 135 at the furthest possible distance away from each other in the up-down direction of the shaft portion 35b increases the effect of preventing the magnet holder 35 from tilting.

As illustrated in FIG. 15, the magnet Mq is a disk-shaped or substantially disk-shaped permanent magnet to be press-fitted into the magnet holding portion 35a of the magnet holder 35, and has a top surface Mqa and a lower surface Mqb. In the absolute encoder 2, the upper surface Mqa of the magnet Mq faces the lower surface of the angle sensor Sp with a certain distance in between. A central axis MqC of the magnet Mq (axis representing the center of the magnet Mq or axis passing through the center of a magnetic pole boundary) coincides with a central axis SC of the magnet holder 35, a central axis GsC of the secondary shaft gear 30, and a central axis BC of the bearing 135. When these central axes are made to coincide with each other, the rotation angle or the amount of rotation can be detected with higher accuracy.

Note that in the embodiment of the present invention, the two magnetic poles (N/S) of the magnet Mq are preferably formed adjacent to each other in a horizontal plane (XY plane) perpendicular to the central axis MqC of the magnet Mq. With this configuration, the detection accuracy of the rotation angle or the amount of rotation by the angle sensor Sq can be further improved. Note that the magnet Mq is formed from a magnetic material such as a ferritic material, an Nd (neodymium) —Fe (iron) —B (boron) material. The magnet Mq may be, for example, a rubber magnet or a bond magnet including a resin binder.

In the absolute encoder 2, the main shaft gear 10, the intermediate gear 20, and the secondary shaft gear 30 are provided as described above, and the rotation axis lines of the main shaft gear 10 and the secondary shaft gear 30 are parallel to each other. Further, the rotation axis line of the intermediate gear 20 is located at a twisted position with respect to the rotation axis lines of the main shaft gear 10 and the secondary shaft gear 30. By arranging each gear in this manner, the amount of rotation of the main shaft gear 10 over multiple rotations can be identified according to the detection result of the angle sensor Sq. Because the rotation axis line of the intermediate gear 20 is located at a twisted position relative to the rotation axis lines of the main shaft gear 10 and the secondary shaft gear 30 and is orthogonal to the rotation axis lines in a front view, the absolute encoder 2 can include a bent transmission path and be made thinner.

Backlash Reduction Mechanism

As described above, the absolute encoder 2 includes the biasing mechanism 40 biasing the second worm gear portion 22 in the direction of the second worm wheel portion 31, and the biasing mechanism 40 is a backlash reduction mechanism configured to reduce backlash between the second worm gear portion 22 and the second worm wheel portion 31. As illustrated in FIGS. 5, 6, 10, 13, and others, the biasing mechanism 40 includes the biasing spring 41, the support projection 45, and a screw 8d for fixing the biasing spring 41 to the support projection 45. The through-hole 143 of the support projection 141 and the through-hole 145 of the support projection 142 of the base portion 3 described above also constitute the biasing mechanism 40.

The biasing spring 41 is a member for generating a pressing force pressing the second worm gear portion 22 in the direction of the second worm wheel portion 31, and is an elastic member. The biasing spring 41 is, for example, a leaf spring, and is formed of a metal plate. As illustrated in detail in FIGS. 11 and 13, the biasing spring 41 includes a spring portion 42 being a portion elastically deforming and generating a pressing force, and an engaging portion 43 and a fixing portion 44 being opposing portions sandwiching the spring portion 42. The engaging portion 43 and the fixing portion 44 are portions forming the pair of end portions of the biasing spring 41.

The fixing portion 44 is formed to be fixed to the support projection 45 projecting from the upper surface 104 of the base portion 101 of the base 3 by the screw 8d. The screw 8d is an example of a fixing member. A hole 44a receiving insertion of the screw 8d is formed in the fixing portion 44. The fixing portion 44 extends in a planar shape and is configured to be fixed to the support projection 45 by the screw 8d while in contact with a planar support surface 45a of the support projection 45.

Figure 13:
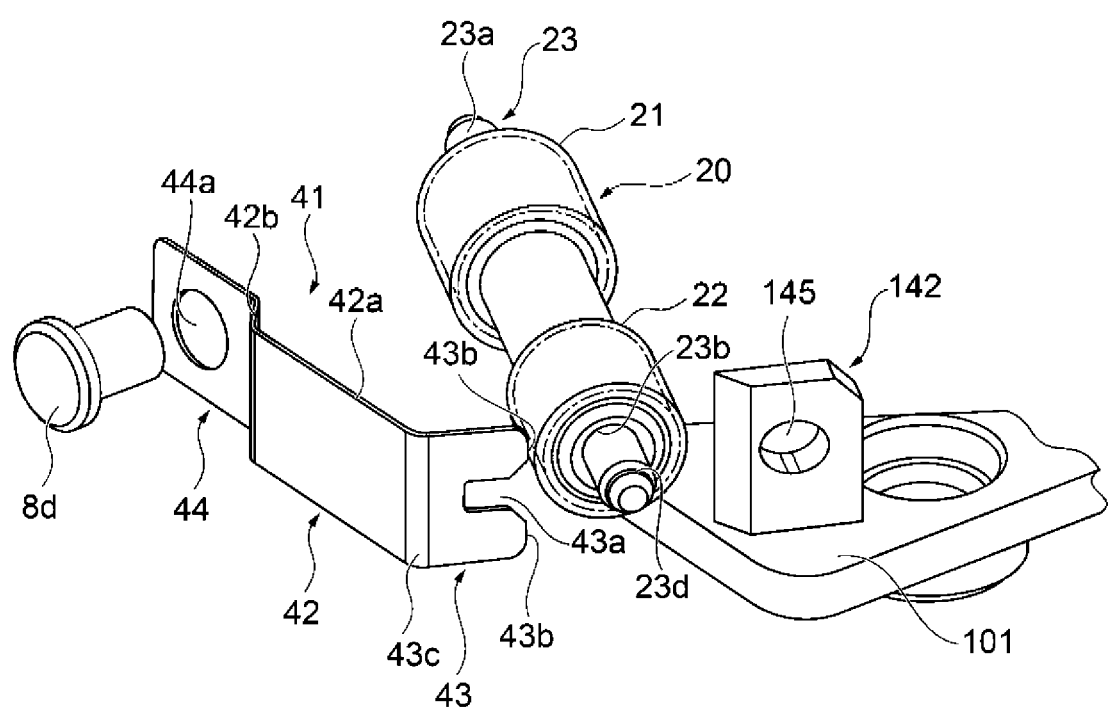
FIG. 13 is an exploded perspective view schematically illustrating the configuration of the absolute encoder in FIG. 11 with a base, the intermediate gear, an intermediate gear shaft, a leaf spring, and a screw disassembled.

The engaging portion 43 has a shape capable of engaging with the secondary shaft-side end portion 23b of the intermediate gear shaft 23. The engaging portion 43 includes, for example, an engagement groove 43a forming a gap extending along the extension direction from the spring portion 42 of the engaging portion 43, as illustrated in FIGS. 12 and 13. The engagement groove 43a is a groove open to a side of a tip end edge 43b being an end edge opposing a connection portion 43c of the engaging portion 43 with the spring portion 42, and is formed by a branched portion divided into two prongs, similar to the first end 9a of the leaf spring 9 described above. The engaging portion 43 extends in a planar shape. An engagement-receiving groove 23d being an annular groove extending in a direction orthogonal or substantially orthogonal to the central axis of the intermediate gear shaft 23, is formed in the secondary shaft-side end portion 23b of the intermediate gear shaft 23. The engagement groove 43a of the engaging portion 43 can engage with the engagement-receiving groove 23d. When one side of the engagement groove 43a parallel to the up-down direction presses the intermediate gear shaft 23 in the engagement-receiving groove 23d, the intermediate gear 22 is biased in the direction of the second worm gear portion 22 moving toward the second worm wheel portion 31. Additionally, two sides of the engagement groove 43a parallel to the left-right direction are in contact with the intermediate gear shaft 23 in the engagement-receiving groove 23d, and movement of the biasing spring 41 in the up-down direction is restricted by the intermediate gear shaft 23.

The spring portion 42 has a shape being likely to elastically deform in the engagement direction of the engaging portion 43 to the intermediate gear shaft 23. Specifically, as illustrated in FIG. 13, the spring portion 42 has a shape being likely to deflect in the extension direction of the engagement groove 43a. For example, the spring portion 42 includes an arm portion 42a extending in a planar shape from the connection portion 43c of the engaging portion 43, and a raised portion 42b connecting the arm portion 42a and the fixing portion 44. The raised portion 42b is a portion extending obliquely from the fixing portion 44 to one side facing the fixing portion 44.

The biasing spring 41 is fixed to the support projection 45 by the screw 8d at the fixing portion 44 in an orientation of the raised portion 42b being raised from the fixing portion 44 at the side opposite to the support projection 45. In this fixed state, the dimensions of the spring portion 42 and the engaging portion 43, the angle between the extending direction of the spring portion 42 and the extending direction of the engaging portion 43, and the like are set such that the engagement groove 43a of the engaging portion 43 engages with the engagement-receiving groove 23d of the intermediate gear shaft 23 and, in this engaged state, the spring portion 42 generates a pressing force pressing the engaging portion 43 against the intermediate gear shaft 23. Also, in the fixed and engaged state of the biasing spring 41, the snap ring 144 attached to the intermediate gear shaft 23 is in contact with the outer side surface 141a of the support projection 141. In order to reduce backlash as to be described below, the engagement groove 43a of the engaging portion 43 is preferably formed extending in a direction orthogonal or substantially orthogonal to the central axis of the intermediate gear shaft 23 in the fixed state of the biasing spring 41. Note that the snap ring 144 can be omitted because the biasing spring 41 can restrict movement of the intermediate gear shaft 23 in the central axial direction.

Next, the action of the biasing mechanism 40 of the absolute encoder 2 will be described.

In the absolute encoder 2, the intermediate gear shaft 23 is supported at the base 3 by the main shaft-side end portion 23a being inserted into the through-hole 143 formed in the support projection 141 of the base 3 and the secondary shaft-side end portion 23b being inserted into the through-hole 145 formed in the support projection 142 of the base 3. Further, the snap ring 144 is attached to the groove 23c of the main shaft-side end portion 23a inserted into the through-hole 143 in the support projection 141, and the snap ring 144 is attached to the groove 23c positioned at a side of the support projection 141 facing the outer side surface 141a. In this manner, the intermediate gear shaft 23 is supported by the support projections 141 and 142 while movement from the main shaft-side end portion 23a toward the secondary shaft-side end portion 23b is restricted.

The intermediate gear 20 is thus rotatably supported by the intermediate gear shaft 23. Further, due to the action of the leaf spring 9, the intermediate gear 20 is biased toward the support projection 142, and the secondary shaft-side sliding portion 26 of the intermediate gear 20 abuts against an inner side surface 142a of the support projection 142 (see FIG. 12).

As described above, the through-hole 145 has a long hole shape with the major axis longer than the minor axis and supports the secondary shaft-side end portion 23b of the intermediate gear shaft 23. Further, in the through-hole 145, the secondary shaft-side end portion 23b is supported such that the secondary shaft-side end portion 23b can move along the major axis of the through-hole 145, that is, within the range of the major axis width of the through-hole 145 along with a horizontal plane. On the other hand, the through-hole 141 supporting the main shaft-side end portion 23a of the intermediate gear shaft 23 has a round hole shape. Thus, in the absolute encoder 2, the intermediate gear shaft 23 can oscillate along a horizontal plane by the through-holes 143 and 145 of the support projections 141 and 142 and the biasing mechanism 40, with the supported portion of the main shaft-side end portion 23a as a center or a substantially center.

Also, in the intermediate gear shaft 23 supported in this manner, the engaging portion 43 of the biasing spring 41 is engaged with the engagement-receiving groove 23d of the secondary shaft-side end portion 23b, and the biasing spring 41 applies a biasing force to the secondary shaft-side end portion 23b of the intermediate gear shaft 23 to press the second worm gear portion 22 of the intermediate gear 20 toward the direction of the second worm wheel portion 31 (second meshing direction P2) of the secondary shaft gear 30. As a result, the second worm gear portion 22 of the intermediate gear 20 is pressed against the second worm wheel portion 31 of the secondary shaft gear 30, causing a so-called "bottoming-out" phenomenon occurs between the second worm gear portion 22 and the second worm wheel portion 31 such that the backlash between gears is zero.

Further, since the secondary shaft-side end portion 23b at the moving side of the intermediate gear shaft 23, supported in an oscillating manner, is biased by the biasing spring 41, during oscillation, the intermediate gear shaft 23 is constantly biased in the direction of the second worm gear portion 22 moving toward the second worm wheel portion 31. Therefore, the backlash between the second worm gear portion 22 and the second worm wheel portion 31 can always be made zero without causing rotation malfunction between gears due to oscillation of the intermediate gear shaft 23.

For example, when the ambient temperature around the absolute encoder 2 is high, the secondary shaft gear 30 expands according to the linear expansion coefficient of the material, and the pitch circles of the gears of the second worm wheel portion 31 expand. At this time, if the through-hole 145 formed in the support projection 142 of the base 3 is a round hole and not a long hole as in the present embodiment, the secondary shaft-side end portion 23b of the intermediate gear shaft 23 is fixed by the through-hole 145, and the intermediate gear shaft 23 cannot oscillate as in the present embodiment. Therefore, the second worm wheel portion 31 of the secondary shaft gear 30, having expanded gear pitch circles due to the increase in temperature, may come into forceful contact with the second worm gear portion 22 of the intermediate gear 22 and the gear may not rotate.

Additionally, when the ambient temperature around the absolute encoder 2 is low, the secondary shaft gear 30 contracts according to the linear expansion coefficient of the material, and the pitch circles of the gears of the second worm wheel portion 31 decrease. At this time, if the through-hole 145 formed in the support projection 142 of the base 3 is a round hole and not a long hole as in the present embodiment, the secondary shaft-side end portion 23b of the intermediate gear shaft 23 is fixed by the through-hole 145, and the intermediate gear shaft 23 cannot oscillate as in the present embodiment. In this case, the backlash between the second worm gear portion 22 of 22 of the intermediate gear and the second worm wheel portion 31 of the secondary shaft gear 30 increases, and the rotation of the 20 of the intermediate gear is not accurately transferred to the secondary shaft gear 30.

In contrast, in the absolute encoder 2 according to the present embodiment, as described above, the intermediate gear shaft 23 is supported in a manner allowing the intermediate gear shaft 23 to oscillate along a horizontal plane with the supported portion of the main shaft-side end portion 23a as a center or substantial center, and the intermediate gear 20 is constantly biased from the second worm gear portion 22 side toward the second worm wheel portion 31 side by the biasing mechanism 40. Additionally, the intermediate gear 20 supported by the intermediate gear shaft 23 is biased toward the support projection 142 by the leaf spring 9. Therefore, even when a change in the ambient temperature occurs and the pitch circles of the gears of the second worm wheel portion 31 of the secondary shaft gear 30 change as described above, the backlash becomes zero while the tooth surfaces between the second worm gear portion 22 and the second worm wheel portion 31 are kept in contact by an appropriate pressing force. Therefore, it is possible to avoid non-rotation of the gear due to the change in temperature and deterioration of the accuracy of the rotation transmitted from the intermediate gear 20 to the secondary shaft gear 30.

Note that, regardless of the position of the secondary shaft-side end portion 23b of the intermediate gear shaft 23 due to oscillation, the biasing mechanism 40 is preferably set such that a constant or substantially constant pressing force is generated from the biasing spring 41.

As described above, the through-hole 143 of the support projection 141 supporting the main shaft-side end portion 23a of the intermediate gear shaft 23 has a round hole shape, the through-hole 145 of the support projection 142 supporting the secondary shaft-side end portion 23b has a long hole shape with the major axis-side width larger than the minor axis-side width, and the intermediate gear shaft 23 can oscillate in parallel or substantially parallel with the horizontal direction with the through-hole 143 of the support projection 141 as a fulcrum. Therefore, during oscillation of the intermediate gear shaft 23, the amount of movement of the second worm gear portion 22 relative to the second worm wheel portion 31 is greater than the amount of movement of the first worm wheel portion 21 relative to the first worm gear portion 11, and the first worm gear portion 11 and the first worm wheel portion 21 do not bottom out even if the second worm gear portion 22 and the second worm wheel portion 31 bottom out.

Figure 16:
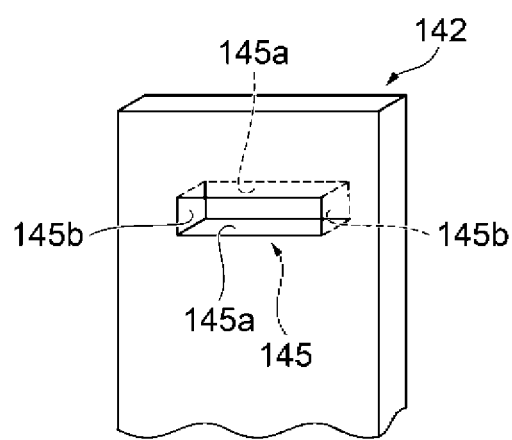
FIG. 16 is a diagram schematically illustrating a modified example of a support projection supporting a main shaft-side end portion of an intermediate gear shaft in the absolute encoder.

As illustrated in FIGS. 10 to 12, the through-hole 145 supporting the intermediate gear shaft 23 at the secondary shaft-side end portion 23b forms a cylindrical surface or a substantially cylindrical surface, but the through-hole 145 is not limited to having such a shape. For example, as illustrated in FIG. 16, the cross-sectional shape of the through-hole 145 may be a rectangle or a substantial rectangle instead of a long hole. In other words, the through-hole 145 may be a through-hole extending in a quadrangular pillar shape and forming a pair of surfaces 145a opposing each other and a pair of surfaces 145b opposing each other. The pair of surfaces 145a and the pair of surfaces 145b forming the through-hole 145 may be flat surfaces or curved surfaces. In the absolute encoder 2, the pair of surfaces 145a extend in the horizontal direction, and the pair of surfaces 145b extend in the up-down direction. The width in the horizontal direction of the surface 145a is greater than the width in the vertical direction of the surface 145b. The intermediate gear shaft 23 can oscillate in the through-hole 145 illustrated in FIG. 16, similarly to the through-hole 145 described above.

Figure 17:
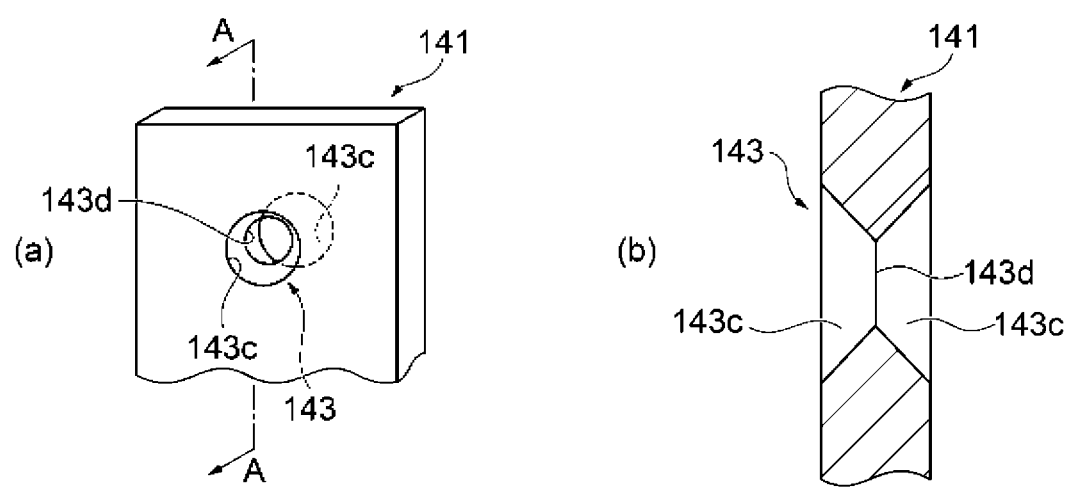
FIG. 17 is a diagram schematically illustrating a modified example of the support projection supporting the main shaft-side end portion of the intermediate gear shaft in the absolute encoder.

Similarly, the through-hole 143 is not limited to having the shape described above. For example, the through-hole 143 may have a so-called knife edge structure. More specifically, the through-hole 143 may be in contact with the intermediate gear shaft 23 by line contact or point contact. For example, as illustrated in (a) and (b) of FIG. 17, the through-hole 143 may be formed by a pair of conical or substantially conical inclined surfaces 143c having a smaller diameter further inward along the extension direction of the through-hole 143. In this case, the through-hole 143 is in contact with and supports the intermediate gear shaft 23 along a closed line (connection line 143d) depicting a round hole of the connection portions of the pair of inclined surfaces 143c. The round hole shape of the connection line 143d has a similar shape in a plan view to the round hole shape of the through-hole 143 described above. Since the through-hole 143 supports the intermediate gear shaft 23 by line contact or point contact, the intermediate gear shaft 23 can be oscillate even if the diameter of the round hole of the through-hole 143 is made closer to the diameter of the intermediate gear shaft 23. Thus, the cross-sectional shape of the through-hole 143 can be made closer to a shape having no gap between the through-hole 143 and the intermediate gear shaft 23. Such a configuration can suppress movement of the portion of the intermediate gear shaft 23 in contact with the through-hole 143 during oscillation of the intermediate gear shaft 23, and the oscillation of the intermediate gear shaft 23 can suppress variation in the distance between the first worm gear portion 11 and the first worm wheel portion 21. Note that the through-hole 145 of the support projection 142 may also have the so-called knife edge structure like the through-hole 143 of the support projection 141 described above, or may be formed by a pair of conical or substantially conical inclined surfaces forming a closed line depicting a long hole.

Figure 18:
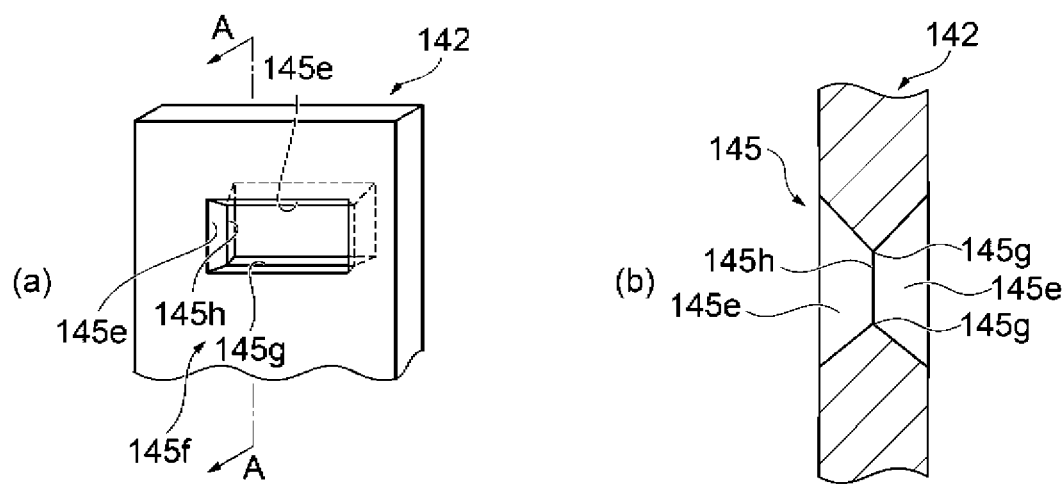
FIG. 18 is a diagram schematically illustrating a modified example of the support projection supporting the main shaft-side end portion of the intermediate gear shaft in the absolute encoder.

Furthermore, as illustrated in (a) and (b) of FIG. 18, the through-hole 145 may be formed by a pair of quadrangular pyramid-shaped or substantially quadrangular pyramid-shaped inclined surfaces 145e tapering toward the inner side in the extension direction of the through-hole 145. In this case, the through-hole 145 is in contact with and supports the intermediate gear shaft 23 along a closed line (connection line 145f) depicting a rectangular shape or substantially rectangular shape of the connection portions of the pair of inclined surfaces 145e. The connection line 145f has line portions 145g being a pair of portions opposing each other, and line portions 145h being a pair of portions opposing each other. The pair of line portions 145g and the pair of line portions 145h may be straight lines or curved lines. In the absolute encoder 2, the pair of line portions 145g extend horizontally, and the pair of line portions 145h extend in the up-down direction. The length of the line portion 145g is greater than the length of the line portion 145h in the up-down direction. Note that the through-hole 143 of the support projection 141 may also be formed by a pair of quadrangular pyramid-shaped or substantially quadrangular pyramid-shaped inclined surfaces forming a closed line depicting a rectangular shape or a substantially rectangular shape, similar to the through-hole 145 of the support projection 142 described above. In this case, the closed line is a square or a substantial square. In this case as well, similar to the case illustrated in FIG. 17 described above, since the through-hole 143 supports the intermediate gear shaft 23 by line contact or point contact, the intermediate gear shaft 23 can oscillate even if the length of the line portion extending in the up-down direction (corresponding to the line portion 145h in FIG. 18) and the length of the line portion extending in the horizontal direction (corresponding to the line portion 145g in FIG. 18) is made closer to the diameter of the intermediate gear shaft 23. Thus, the shape of the through-hole 143 can be made closer to a shape having no gap in the up-down direction and the horizontal direction between the through-hole 143 and the intermediate gear shaft 23. Such a configuration can suppress movement of the portion of the intermediate gear shaft 23 in contact with the through-hole 143 during oscillation of the intermediate gear shaft 23, and the oscillation of the intermediate gear shaft 23 can suppress variation in the distance between the first worm gear portion 11 and the first worm wheel portion 21.

Control Unit

Next, a control unit of the absolute encoder 2 will be described. FIG. 19 is a diagram illustrating the substrate 5 in FIG. 2 as viewed from the lower surface 5a side. The microcomputer 51, a line driver 52, a bidirectional driver 53, and the connector 6 are mounted on the substrate 5. The microcomputer 51, the line driver 52, the bidirectional driver 53, and the connector 6 are electrically connected by pattern wiring on the substrate 5.

The bidirectional driver 53 performs bidirectional communication with an external device connected to the connector 6. The bidirectional driver 53 converts data such as operation signals into differential signals to communicate with the external device. The line driver 52 converts data representing the amount of rotation into a differential signal, and outputs the differential signal in real time to the external device connected to the connector 6. The connector 6 is connected to a connector of the external device.

Figure 20:
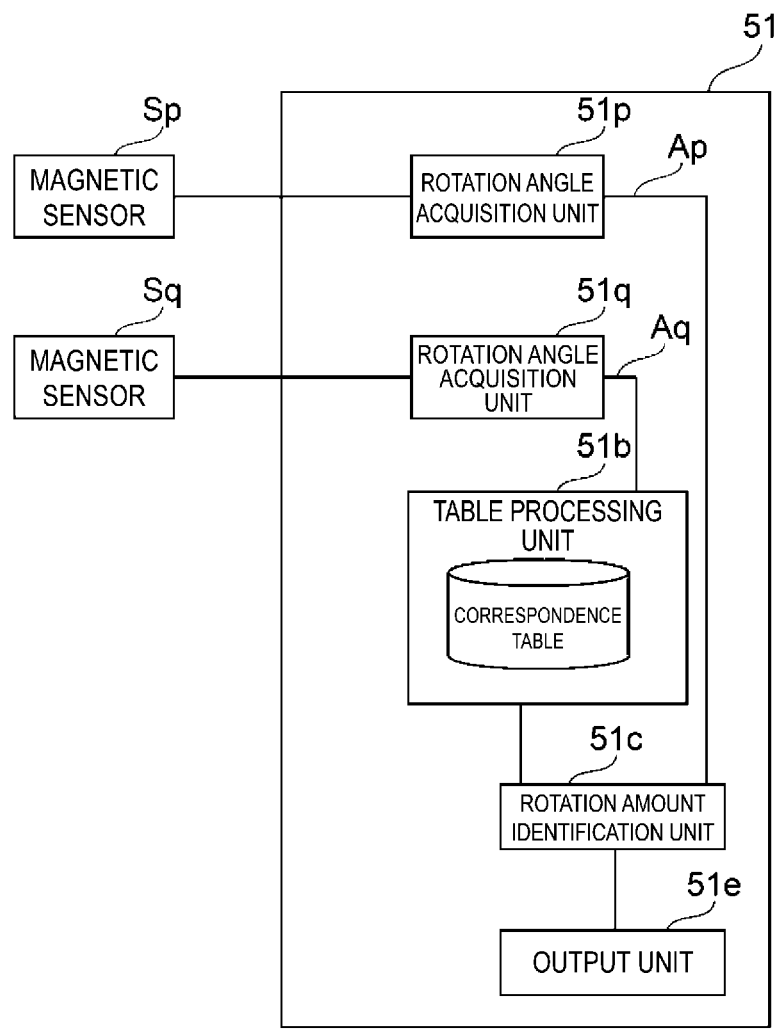
FIG. 20 is a block diagram schematically illustrating a functional configuration of the absolute encoder in FIG. 1.

FIG. 20 is a block diagram schematically illustrating a functional configuration of the absolute encoder 2 in FIG. 1. Each block of the microcomputer 51 illustrated in FIG. 20 represents a function realized by executing a program by using a central processing unit (CPU) serving as the microcomputer 51.

The microcomputer 51 includes a rotation angle acquisition unit 51p, a rotation angle acquisition unit 51q, a table processing unit 51b, a rotation amount identification unit 51c, and an output unit 51e. The rotation angle acquisition unit 51p acquires a rotation angle Ap of the main shaft gear 10 based on a signal output from the angle sensor Sp. The rotation angle Ap is angle information indicating the rotation angle of the main shaft gear 10. The rotation angle acquisition unit 51q acquires a rotation angle Aq of the secondary shaft gear 30 based on a signal output from the magnetic sensor Sq. The rotation angle Aq is angle information indicating the rotation angle of the secondary shaft gear 30. The table processing unit 51b refers to a correspondence table storing the rotation angle Aq of the secondary shaft gear 30 and the rotation speed of the main shaft gear 10 corresponding to the rotation angle Aq of the secondary shaft gear 30 to identify the rotation speed of the main shaft gear 10 corresponding to the acquired rotation angle Aq of the secondary shaft gear 30. The rotation amount identification unit 51c identifies the amount of rotation of the main shaft gear 10 over multiple rotations according to the rotation speed of the main shaft gear 10 identified by the table processing unit 51b and the acquired rotation angle Ap of the main shaft gear 10. The output unit 51e converts the identified amount of rotation of the main shaft gear 10 over multiple rotations to information indicating the amount of rotation and outputs the information.

As described above, in the absolute encoder 2 according to the present embodiment, the backlash between the second worm gear portion 22 of the intermediate gear 20 and the second worm wheel portion 31 of the secondary shaft gear 30 can be made zero due to the action of the through-holes 143 and 145 supporting the intermediate gear shaft 23 and the biasing spring 41. Furthermore, even when the ambient temperature changes, the backlash can be made zero while the teeth surfaces of the second worm gear portion 22 of the intermediate gear 20 and the second worm wheel portion 31 of the secondary shaft gear 30 are always in contact at an appropriate pressing force by the action of the biasing spring 41 with respect to the intermediate gear shaft 23, supported in a manner allowing oscillation. Therefore, it is possible to avoid non-rotation of the gears due to a change in temperature and deterioration of the accuracy of the rotation transmitted from the intermediate gear 20 to the secondary shaft gear 30.

In this way, according to the absolute encoder 2 according to the present embodiment, the influence of backlash in a reduction mechanism on detection accuracy can be reduced. As a result, it is possible to widen the range of the identifiable amount of rotation of the main shaft 1a while maintaining the identifiable resolution of the amount of rotation of the main shaft 1a.

In addition, in the absolute encoder 2 according to the present embodiment, the intermediate gear 20 disposed along the horizontal plane is provided to extend obliquely with respect to the outer peripheral surfaces 105 to 108 of the base 3. Thus, the dimensions of the absolute encoder 2 in the front-rear direction and the left-right direction can be reduced.

Additionally, in the absolute encoder 2 according to the present embodiment, the outer diameters of the worm wheel portions 21 and 31 and the outer diameters of the worm gear portions 11 and 22 are set to the smallest possible value. This makes it possible to reduce the dimensions of the absolute encoder 2 in the up-down direction (height direction).

An embodiment of the present invention has been described above, but the present invention is not limited to the absolute encoder 2 according to the embodiment of the present invention described above, and includes various aspects included in the gist of the present invention and the scope of the claims. Further, configurations may be combined with each other or combined with known technology as appropriate to at least partially address the problem described above and achieve the effects described above. For example, a shape, a material, an arrangement, a size, and the like of each of the components in the embodiment described above may be changed as appropriate according to a specific usage aspect of the present invention.

REFERENCE SIGNS LIST

1 Motor
1a Main shaft
1b Press-fitting section
2 Absolute encoder
3 Base
4 Case
4a Outer wall portion
4b Lid portion
4c Hook portion
5 Substrate
5a Lower surface
5b Positioning hole
6 Connector
8a, 8b, 8c, 8d Screw
9 Leaf spring
9a First end
9b Second end
10 Main shaft gear
11 First worm gear portion
12 Main shaft adapter
12a Upper end surface
13 Tubular portion
13a Upper end surface
14 Press-fitting section
15 Magnet holding portion
15a Inner peripheral surface
15b Bottom surface
20 Intermediate gear
21 First worm wheel portion
22 Second worm gear portion
23 Intermediate gear shaft
23a Main shaft-side end portion
23b Secondary shaft-side end portion
23c Groove
23d Engagement-receiving groove
24 Tubular portion
24a Through-hole
24b Inner peripheral surface
25 Main shaft-side sliding portion
26 Secondary shaft-side sliding portion
30 Secondary shaft gear
31 Second worm wheel portion
32 Through-hole
35 Magnet holder
35a Magnet holding portion
35b Shaft portion
40 Biasing mechanism
41 Biasing spring
42 Spring portion
42a Arm portion
42b Raised portion
43 Engaging portion
43a Engagement groove
43b Tip end edge
43c Connection portion
44 Fixing portion
44a Hole
45 Support projection
45a Support surface
51 Microcomputer
51b Table processing unit
51c Rotation amount identification unit
51e Output unit
51p, 51q Rotation angle acquisition unit
52 Line driver
53 Bidirectional driver
101 Base portion
102 Lower surface
103 Recess part
104 Upper surface
105 to 108 Outer peripheral surface
110 Substrate pillar
111 Upper end surface
112 Screw hole
120 Substrate positioning pin
121 Tip end portion
122 Base portion
123 Stepped surface
131, 132, 141, 142 Support projection
131a Screw hole
134 Bearing holder portion
135 Bearing
141a Outer side surface
142a Inner side surface
143, 145 Through-hole
145a, 145b Surface
143c, 145e Inclined surface
143d, 145f Connection line
145 g, 145 h Line portion
144 Snap ring
Ap, Aq Angle information
BC Center of bearing
GmC Central axis of main shaft gear
GsC Central axis of secondary shaft gear
MoC Central axis of main shaft of motor
Mp, Mq Magnet
Mpa, Mqa Top surface
Mpb, Mqb Lower surface
Mpd, Mqd Outer peripheral surface
MpC, MqC Central axis of magnet
P1 First meshing direction
P2 Second meshing direction
R1 First transmission mechanism
R2 Second transmission mechanism
SaC Central axis of main shaft adapter
SC Central axis of magnet holder
Sp, Sq Angle sensor
XYZ Cartesian coordinate system

The invention claimed is:

1. An absolute encoder configured to identify an amount of rotation of a main shaft over multiple rotations, the absolute encoder comprising:
a first drive gear configured to rotate according to rotation of the main shaft;
a first driven gear configured to mesh with the first drive gear;
a second drive gear provided coaxially with the first driven gear and configured to rotate according to rotation of the first driven gear;
a second driven gear configured to mesh with the second drive gear; and
a biasing mechanism configured to bias the second drive gear in a direction of the second driven gear;
wherein the first drive gear and the first driven gear are configured so that a backlash between the first drive gear and the first driven gear is not zero even when a backlash between the second drive gear and the second driven gear is zero.

2. The absolute encoder according to claim 1, further comprising:
a shaft configured to coaxially support the first driven gear and the second drive gear, wherein the biasing mechanism biases the shaft in the direction of the second driven gear.

3. The absolute encoder according to claim 1, further comprising:
a first shaft support portion configured to support the shaft at the first driven gear side; and
a second shaft support portion configured to support the shaft at the second drive gear side,
wherein the biasing mechanism causes the second shaft support portion to oscillate and a first end portion of the shaft being a fulcrum.

4. The absolute encoder according to claim 3,
wherein an amount of movement enabling movement of the second drive gear in a second meshing direction being a direction of the second drive gear moving toward the second driven gear by the biasing mechanism is greater than an amount of movement enabling movement of the first driven gear in a first meshing direction being a direction of the first driven gear moving toward the first drive gear by the biasing mechanism.

5. The absolute encoder according to claim 1, wherein a reduction ratio between the second drive gear and the second driven gear is greater than a reduction ratio between the first drive gear and the first driven gear.

6. An absolute encoder configured to identify an amount of rotation of a main shaft over multiple rotations, the absolute encoder comprising:
a first drive gear configured to rotate according to rotation of the main shaft;
a first driven gear configured to mesh with the first drive gear;
a second drive gear configured to rotate according to rotation of the first driven gear;
a second shaft comprising the first driven gear and the second drive gear arranged coaxially along the second shaft;
a second driven gear configured to mesh with the second drive gear; and
a biasing mechanism configured to provide a biasing force to the second drive gear in a direction of the second driven gear,
wherein the magnitude of the biasing force is sufficient to cause a first backlash between the first drive gear and the first driven gear to be non-zero while a second backlash between the second drive gear and the second driven gear is zero.

7. The absolute encoder according to claim 6, wherein the biasing force is applied to the second shaft in the direction of the second driven gear.

8. The absolute encoder according to claim 6, further comprising:
a first shaft support portion configured to support the second shaft at a first driven gear side;
a second shaft support portion configured to support the second shaft at a second drive gear side,
wherein the biasing mechanism causes the second shaft support portion to oscillate and a first end portion of the second shaft to act as a fulcrum.

9. The absolute encoder according to claim 8,
wherein an amount of movement enabling movement of the second drive gear in a second meshing direction being a direction of the second drive gear moving toward the second driven gear by the biasing mechanism is greater than an amount of movement enabling movement of the first driven gear in a first meshing direction being a direction of the first driven gear moving toward the first drive gear by the biasing mechanism.

10. The absolute encoder according to claim 6, wherein a reduction ratio between the second drive gear and the second driven gear is greater than a reduction ratio between the first drive gear and the first driven gear.

11. An absolute encoder configured to identify an amount of rotation of a main shaft over multiple rotations, the absolute encoder comprising:
a first drive gear configured to rotate according to rotation of the main shaft;
a first driven gear configured to mesh with the first drive gear;
a second drive gear configured to rotate according to rotation of the first driven gear;
a second shaft comprising the first driven gear and the second drive gear arranged coaxially;
a second driven gear configured to mesh with the second drive gear; and
a biasing mechanism configured to provide a biasing force to the second drive gear in a direction of the second driven gear;
wherein the magnitude of the biasing force is sufficient to cause a backlash between the second drive gear and the second driven gear to be zero.

12. The absolute encoder according to claim 11, wherein the biasing force is applied to the second shaft in the direction of the second driven gear.

13. The absolute encoder according to claim 11, further comprising:
a first shaft support portion configured to support the second shaft at a first driven gear side;
a second shaft support portion configured to support the second shaft at a second drive gear side,
wherein the biasing mechanism causes the second shaft support portion to oscillate and a first end portion of the second shaft to act as a fulcrum.

14. The absolute encoder according to claim 13,
wherein an amount of movement enabling movement of the second drive gear in a second meshing direction being a direction of the second drive gear moving toward the second driven gear by the biasing mechanism is greater than an amount of movement enabling movement of the first driven gear in a first meshing direction being a direction of the first driven gear moving toward the first drive gear by the biasing mechanism.

15. The absolute encoder according to claim 11, wherein a reduction ratio between the second drive gear and the second driven gear is greater than a reduction ratio between the first drive gear and the first driven gear.

16. The absolute encoder according to claim 11, wherein the magnitude of the biasing force is sufficient to cause a first backlash between the first drive gear and the first driven gear to be non-zero while a second backlash between the second drive gear and the second driven gear is zero.

* * * * *